(12) United States Patent
Robinson et al.

(10) Patent No.: US 10,600,022 B2
(45) Date of Patent: Mar. 24, 2020

(54) SYSTEMS AND METHODS FOR SYNCHRONIZING DELIVERY OF RELATED PARCELS VIA A COMPUTERIZED LOCKER BANK

(71) Applicant: United Parcel Service of America, Inc., Atlanta, GA (US)

(72) Inventors: Kalin Robinson, John's Creek, GA (US); Robert J. Gillen, Alpharetta, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 448 days.

(21) Appl. No.: 15/253,473

(22) Filed: Aug. 31, 2016

(65) Prior Publication Data
US 2018/0060812 A1    Mar. 1, 2018

(51) Int. Cl.
| | |
|---|---|
| *G06Q 10/08* | (2012.01) |
| *G06Q 10/10* | (2012.01) |
| *G06Q 40/02* | (2012.01) |
| *G07C 9/00* | (2020.01) |

(52) U.S. Cl.
CPC ..... *G06Q 10/0836* (2013.01); *G06Q 10/1093* (2013.01); *G06Q 40/02* (2013.01); *G07C 9/00174* (2013.01); *G07C 9/00912* (2013.01)

(58) Field of Classification Search
USPC .................... 705/339, 28; 235/385; 340/5.92
See application file for complete search history.

(56) References Cited

U.S. PATENT DOCUMENTS

| | | |
|---|---|---|
| 3,712,468 A | 1/1973 | Wenner et al. |
| 5,153,842 A | 10/1992 | Dlugos, Sr. et al. |
| 5,168,444 A | 12/1992 | Cukor et al. |
| (Continued) | | |

FOREIGN PATENT DOCUMENTS

| | | |
|---|---|---|
| CA | 2893502 A1 | 11/2004 |
| CA | 2551885 A1 | 8/2006 |
| (Continued) | | |

OTHER PUBLICATIONS

Pender, Lee, Hard Times Are the Best Times, Magazine, Aug. 15, 2001 (Retrieved on Apr. 25, 2003), p. 3, Paragraph 3, Retrieved from the Internet: <URL:http://www.cio.com/archive/081501/besttimes_contenl.html>.

(Continued)

*Primary Examiner* — Akiba K Allen
(74) *Attorney, Agent, or Firm* — Shook, Hardy & Bacon L.L.P.

(57) ABSTRACT

A synchronized delivery system for delivering parcels directly to an alternate delivery location such as a locker bank in lieu of making any delivery attempt at a primary delivery location such as a home or office. The system may deliver parcels directly to the alternate delivery location when a related parcel is currently stored at the alternate delivery location awaiting pickup. A related parcel may include a parcel addressed to the same consignee, to a related consignee (e.g., such as a neighbor, roommate, or spouse), or to another authorized to pick up parcels on behalf of the consignee. When delivering parcels to alternate deliver locations, the system may facilitate a grouping of related parcels in a single locker.

20 Claims, 10 Drawing Sheets

(56) References Cited

U.S. PATENT DOCUMENTS

| | | |
|---|---|---|
| 5,375,240 A | 12/1994 | Grundy |
| 5,400,020 A | 3/1995 | Jones et al. |
| 5,444,444 A | 8/1995 | Ross et al. |
| 5,623,260 A | 4/1997 | Jones et al. |
| 5,648,770 A | 7/1997 | Ross et al. |
| 5,656,799 A | 8/1997 | Ramsden et al. |
| 5,657,010 A | 8/1997 | Jones et al. |
| 5,668,543 A | 9/1997 | Jones et al. |
| 5,726,435 A | 3/1998 | Hara et al. |
| 5,774,053 A | 6/1998 | Porter |
| 5,786,748 A | 7/1998 | Nikolic et al. |
| 5,831,220 A | 11/1998 | Ramsden et al. |
| 5,831,860 A | 11/1998 | Foladare et al. |
| 5,979,750 A | 11/1999 | Kindell |
| 6,010,064 A | 1/2000 | Umeda et al. |
| 6,026,375 A | 2/2000 | Hall et al. |
| 6,028,517 A | 2/2000 | Sansone et al. |
| 6,047,264 A | 4/2000 | Fisher et al. |
| 6,085,170 A | 7/2000 | Tsukuda |
| 6,208,980 B1 | 3/2001 | Kara |
| 6,211,781 B1 | 4/2001 | McDonald |
| 6,220,509 B1 | 4/2001 | Byford |
| 6,236,972 B1 | 5/2001 | Shkedy |
| 6,278,936 B1 | 8/2001 | Jones |
| 6,285,916 B1 | 9/2001 | Kadaba et al. |
| 6,289,323 B1 | 9/2001 | Gordon et al. |
| 6,304,856 B1 | 10/2001 | Soga et al. |
| 6,313,760 B1 | 11/2001 | Jones |
| 6,317,060 B1 | 11/2001 | Jones |
| 6,323,254 B1 | 11/2001 | Weikard et al. |
| 6,323,782 B1 | 11/2001 | Stephens et al. |
| 6,343,275 B1 | 1/2002 | Wong |
| 6,344,796 B1 | 2/2002 | Ogilvie et al. |
| 6,356,196 B1 | 3/2002 | Wong |
| 6,363,323 B1 | 3/2002 | Jones |
| 6,411,891 B1 | 6/2002 | Jones |
| 6,433,732 B1 | 8/2002 | Dutta et al. |
| 6,442,589 B1 | 8/2002 | Takahashi et al. |
| 6,456,900 B1 | 9/2002 | Kakuta |
| 6,463,420 B1 | 10/2002 | Guidice et al. |
| 6,480,758 B2 | 11/2002 | Stevens |
| 6,486,801 B1 | 11/2002 | Jones |
| 6,492,912 B1 | 12/2002 | Jones |
| 6,510,383 B1 | 1/2003 | Jones |
| 6,536,659 B1 | 3/2003 | Hauser et al. |
| 6,539,360 B1 | 3/2003 | Kadaba |
| 6,570,488 B2 | 5/2003 | Kucharczyk et al. |
| 6,595,342 B1 | 7/2003 | Maritzen et al. |
| 6,606,604 B1 | 8/2003 | Dutta |
| 6,612,489 B2 | 9/2003 | McCormick et al. |
| 6,615,092 B2 | 9/2003 | Bickley et al. |
| 6,618,668 B1 | 9/2003 | Laird |
| 6,634,551 B2 | 10/2003 | Barta et al. |
| 6,683,542 B1 | 1/2004 | Jones |
| 6,688,435 B1 | 2/2004 | Will et al. |
| 6,690,997 B2 | 2/2004 | Rivalto |
| 6,694,217 B2 | 2/2004 | Bloom |
| 6,700,507 B2 | 3/2004 | Jones |
| 6,701,299 B2 | 3/2004 | Kraisser et al. |
| 6,714,859 B2 | 3/2004 | Jones |
| 6,725,127 B2 | 4/2004 | Stevens |
| 6,741,927 B2 | 5/2004 | Jones |
| 6,748,295 B2 | 6/2004 | Tilles et al. |
| 6,748,318 B1 | 6/2004 | Jones |
| 6,748,320 B2 | 6/2004 | Jones |
| 6,756,879 B2 | 6/2004 | Shuster |
| 6,763,299 B2 | 7/2004 | Jones |
| 6,763,300 B2 | 7/2004 | Jones |
| 6,772,130 B1 | 8/2004 | Karbowski et al. |
| 6,791,450 B2 | 9/2004 | Gokcebay et al. |
| 6,804,606 B2 | 10/2004 | Jones |
| 6,820,805 B2 | 11/2004 | Stevens |
| 6,845,909 B2 | 1/2005 | Bong et al. |
| 6,859,722 B2 | 2/2005 | Jones |
| 6,862,576 B1 | 3/2005 | Turner |
| 6,882,269 B2 | 4/2005 | Moreno |
| 6,902,109 B2 | 6/2005 | Barta et al. |
| 6,904,359 B2 | 6/2005 | Jones |
| 6,933,832 B1 | 8/2005 | Simms et al. |
| 6,950,803 B2 | 9/2005 | Tiley et al. |
| 6,952,645 B1 | 10/2005 | Jones |
| 6,961,711 B1 | 11/2005 | Chee |
| 6,967,575 B1 | 11/2005 | Dohrmann et al. |
| 6,974,928 B2 | 12/2005 | Bloom |
| 6,975,998 B1 | 12/2005 | Jones |
| 6,976,090 B2 | 12/2005 | Ben-Shaul et al. |
| 6,978,929 B2 | 12/2005 | Buie et al. |
| 6,985,871 B2 | 1/2006 | Simon et al. |
| 6,990,467 B1 | 1/2006 | Kwan |
| 6,994,253 B2 | 2/2006 | Miller et al. |
| 7,020,623 B1 | 3/2006 | Tiley et al. |
| 7,028,895 B2 | 4/2006 | Ashaari |
| 7,030,781 B2 | 4/2006 | Jones |
| 7,031,959 B2 | 4/2006 | Garner et al. |
| 7,055,741 B2 | 6/2006 | Bong et al. |
| 7,068,149 B2 | 6/2006 | Lee et al. |
| 7,075,451 B2 | 7/2006 | Yamada |
| 7,110,958 B2 | 9/2006 | Yang |
| 7,133,743 B2 | 11/2006 | Tilles et al. |
| 7,158,941 B1 | 1/2007 | Thompson |
| 7,158,948 B1 | 1/2007 | Rodriguez et al. |
| 7,177,825 B1 | 2/2007 | Borders et al. |
| 7,212,829 B1 | 5/2007 | Lau et al. |
| 7,212,984 B2 | 5/2007 | Wolfe et al. |
| 7,222,081 B1 | 5/2007 | Sone |
| 7,225,983 B2 | 6/2007 | Park et al. |
| 7,233,907 B2 | 6/2007 | Young |
| 7,248,160 B2 | 7/2007 | Mangan et al. |
| 7,249,044 B2 | 7/2007 | Kumar et al. |
| 7,249,087 B2 | 7/2007 | Sharp et al. |
| 7,254,549 B1 | 8/2007 | Bansal et al. |
| 7,257,552 B1 | 8/2007 | Franco |
| 7,267,920 B2 | 9/2007 | Nakazawa et al. |
| 7,312,702 B1 | 12/2007 | Willms et al. |
| 7,337,944 B2 | 3/2008 | Devar |
| 7,341,186 B2 | 3/2008 | Mrozik et al. |
| 7,358,857 B1 | 4/2008 | White |
| 7,376,598 B2 | 5/2008 | Estes et al. |
| 7,385,499 B2 | 6/2008 | Horton et al. |
| 7,422,149 B2 | 9/2008 | Aptekar |
| 7,426,484 B2 | 9/2008 | Joyce et al. |
| 7,479,899 B2 | 1/2009 | Horstemeyer |
| 7,501,946 B2 | 3/2009 | Lanigan et al. |
| 7,509,228 B2 | 3/2009 | Bielefeld et al. |
| 7,511,617 B2 | 3/2009 | Burman et al. |
| 7,528,722 B2 | 5/2009 | Nelson |
| 7,574,366 B2 | 8/2009 | Burman et al. |
| 7,580,845 B2 | 8/2009 | Burman et al. |
| 7,617,133 B1 | 11/2009 | Antony et al. |
| 7,624,024 B2 | 11/2009 | Levis et al. |
| 7,636,696 B1 | 12/2009 | Sigler, Jr. et al. |
| 7,647,231 B2 | 1/2010 | Kuebert et al. |
| 7,653,457 B2 | 1/2010 | Bloom |
| 7,653,603 B1 | 1/2010 | Holtkamp, Jr. et al. |
| 7,657,466 B2 | 2/2010 | Klingenberg et al. |
| 7,660,721 B2 | 2/2010 | Williams et al. |
| 7,693,723 B2 | 4/2010 | Wade |
| 7,711,654 B2 | 5/2010 | Schmidtberg et al. |
| 7,712,670 B2 | 5/2010 | Sauerwein, Jr. et al. |
| 7,742,928 B2 | 6/2010 | Reynolds et al. |
| 7,752,134 B2 | 7/2010 | Spear |
| 7,765,131 B2 | 7/2010 | Klingenberg et al. |
| 7,769,778 B2 | 8/2010 | Snapp et al. |
| 7,815,112 B2 | 10/2010 | Volpe et al. |
| 7,822,618 B2 | 10/2010 | Kaneko |
| 7,831,439 B1 | 11/2010 | Bryar et al. |
| 7,848,961 B2 | 12/2010 | Estes et al. |
| 7,853,481 B1 | 12/2010 | Johnson |
| 7,868,753 B2 | 1/2011 | Jenkins et al. |
| 7,925,524 B2 | 4/2011 | Florence |
| 7,962,422 B1 | 6/2011 | Melechko et al. |
| 7,969,306 B2 | 6/2011 | Ebert et al. |
| 7,984,289 B2 | 7/2011 | Orbke et al. |
| 7,996,328 B1 | 8/2011 | Lundberg et al. |

(56) References Cited

U.S. PATENT DOCUMENTS

| | | |
|---|---|---|
| 8,010,430 B1 | 8/2011 | Chase et al. |
| 8,010,462 B2 | 8/2011 | Kinory et al. |
| 8,015,023 B1 | 9/2011 | Lee et al. |
| 8,027,933 B2 | 9/2011 | Lou et al. |
| 8,036,993 B2 | 10/2011 | Estes |
| 8,073,723 B1 | 12/2011 | Bilibin et al. |
| 8,086,546 B2 | 12/2011 | Spiegel et al. |
| 8,103,521 B2 | 1/2012 | Kuebert et al. |
| 8,103,716 B2 | 1/2012 | Boyce et al. |
| 8,108,265 B2 | 1/2012 | Bonner et al. |
| 8,117,462 B2 | 2/2012 | Snapp et al. |
| 8,131,652 B2 | 3/2012 | Gullo et al. |
| 8,140,551 B2 | 3/2012 | Garner et al. |
| 8,140,592 B2 | 3/2012 | Scott et al. |
| 8,156,007 B1 | 4/2012 | Anthony et al. |
| 8,204,799 B1 | 6/2012 | Murray et al. |
| 8,219,490 B2 | 7/2012 | Hammed et al. |
| 8,225,388 B2 | 7/2012 | Vogel et al. |
| 8,234,275 B2 | 7/2012 | Grant et al. |
| 8,249,998 B2 | 8/2012 | Reynolds et al. |
| 8,255,235 B2 | 8/2012 | Aldstadt |
| 8,255,339 B2 | 8/2012 | Andrew |
| 8,265,947 B2 | 9/2012 | Kuebert et al. |
| 8,280,824 B1 | 10/2012 | Vermeulen et al. |
| 8,291,234 B2 | 10/2012 | Snapp et al. |
| 8,306,923 B1 | 11/2012 | Roache et al. |
| 8,311,895 B1 | 11/2012 | Murugan et al. |
| 8,340,978 B2 | 12/2012 | Wade |
| 8,352,551 B2 | 1/2013 | Campbell et al. |
| 8,356,187 B2 | 1/2013 | Cook et al. |
| 8,364,953 B2 | 1/2013 | Bullard, Jr. |
| 8,380,641 B1 | 2/2013 | Bennett et al. |
| 8,392,262 B2 | 3/2013 | Mallick et al. |
| 8,437,742 B2 | 5/2013 | Garskof |
| 8,468,062 B1 | 6/2013 | Kamdar |
| 8,489,520 B2 | 7/2013 | Kuebert et al. |
| 9,141,931 B2 | 9/2015 | Ackerman |
| 9,195,950 B2 | 11/2015 | Schenken |
| 9,692,738 B1 | 6/2017 | Wenneman et al. |
| 9,798,999 B2 | 10/2017 | Schenken |
| 9,916,557 B1 | 3/2018 | Gillen et al. |
| 9,984,351 B1 | 5/2018 | Antony et al. |
| 10,007,712 B1 | 6/2018 | Williams et al. |
| 2001/0040422 A1 | 11/2001 | Gramlich |
| 2001/0042001 A1 | 11/2001 | Goto et al. |
| 2001/0042024 A1 | 11/2001 | Rogers |
| 2001/0051885 A1 | 12/2001 | Nardulli et al. |
| 2002/0007299 A1 | 1/2002 | Florence |
| 2002/0007353 A1 | 1/2002 | Komacki |
| 2002/0010634 A1 | 1/2002 | Roman et al. |
| 2002/0013744 A1 | 1/2002 | Tsunenari et al. |
| 2002/0016726 A1 | 2/2002 | Ross |
| 2002/0019761 A1 | 2/2002 | Lidow |
| 2002/0019777 A1 | 2/2002 | Schwab et al. |
| 2002/0026380 A1 | 2/2002 | Su |
| 2002/0029194 A1 | 3/2002 | Lewis et al. |
| 2002/0032612 A1 | 3/2002 | Williams et al. |
| 2002/0032613 A1 | 3/2002 | Buettgenbach et al. |
| 2002/0035515 A1 | 3/2002 | Moreno |
| 2002/0038266 A1 | 3/2002 | Tuttrup et al. |
| 2002/0040350 A1 | 4/2002 | Shinzaki |
| 2002/0046056 A1 | 4/2002 | Demarco et al. |
| 2002/0070882 A1 | 6/2002 | Jones |
| 2002/0073039 A1 | 6/2002 | Ogg et al. |
| 2002/0080030 A1 | 6/2002 | Inomata |
| 2002/0082770 A1 | 6/2002 | Jones |
| 2002/0087371 A1 | 7/2002 | Abendroth |
| 2002/0099622 A1 | 7/2002 | Langhammer |
| 2002/0103653 A1 | 8/2002 | Huxter |
| 2002/0103724 A1 | 8/2002 | Huxter |
| 2002/0107820 A1 | 8/2002 | Huxter |
| 2002/0111914 A1 | 8/2002 | Terada et al. |
| 2002/0120475 A1 | 8/2002 | Morimoto |
| 2002/0128915 A1 | 9/2002 | Haseltine |
| 2002/0130065 A1 | 9/2002 | Bloom |
| 2002/0138173 A1 | 9/2002 | Barta et al. |
| 2002/0143670 A1 | 10/2002 | Cushing et al. |
| 2002/0147919 A1 | 10/2002 | Gentry |
| 2002/0156645 A1 | 10/2002 | Hansen |
| 2002/0156846 A1 | 10/2002 | Rawat et al. |
| 2002/0165729 A1 | 11/2002 | Kuebert et al. |
| 2002/0177922 A1 | 11/2002 | Bloom |
| 2002/0178016 A1 | 11/2002 | McLellan |
| 2002/0178074 A1 | 11/2002 | Bloom |
| 2002/0184497 A1 | 12/2002 | Gage et al. |
| 2003/0003936 A1 | 1/2003 | Tighe |
| 2003/0023963 A1 | 1/2003 | Birkholz et al. |
| 2003/0025590 A1 | 2/2003 | Gokcebay et al. |
| 2003/0037009 A1 | 2/2003 | Tobin et al. |
| 2003/0040931 A1 | 2/2003 | De Mol Van Otterloo et al. |
| 2003/0040980 A1 | 2/2003 | Nakajima et al. |
| 2003/0046173 A1 | 3/2003 | Benjier et al. |
| 2003/0093180 A1 | 5/2003 | Stevens |
| 2003/0097287 A1 | 5/2003 | Franz et al. |
| 2003/0110170 A1 | 6/2003 | Matsuoka |
| 2003/0114206 A1 | 6/2003 | Timothy et al. |
| 2003/0160097 A1 | 8/2003 | Steiner |
| 2003/0171996 A1 | 9/2003 | Chen et al. |
| 2003/0193414 A1 | 10/2003 | Jones |
| 2003/0195784 A1 | 10/2003 | Smith, Jr. |
| 2003/0225625 A1 | 12/2003 | Chew et al. |
| 2004/0015393 A1 | 1/2004 | Fong et al. |
| 2004/0030604 A1 | 2/2004 | Young |
| 2004/0039712 A1 | 2/2004 | Tartal et al. |
| 2004/0044582 A1 | 3/2004 | Chowdhary et al. |
| 2004/0073449 A1 | 4/2004 | Yang |
| 2004/0073499 A1 | 4/2004 | Martin et al. |
| 2004/0088225 A1 | 5/2004 | Foth et al. |
| 2004/0093312 A1 | 5/2004 | Cordery et al. |
| 2004/0117276 A1 | 6/2004 | Kettler, III |
| 2004/0117278 A1 | 6/2004 | Dutta et al. |
| 2004/0117326 A1 | 6/2004 | Amato |
| 2004/0133446 A1 | 7/2004 | Myrick et al. |
| 2004/0134690 A1 | 7/2004 | Norris et al. |
| 2004/0143518 A1 | 7/2004 | Siegel |
| 2004/0149822 A1 | 8/2004 | Stevens |
| 2004/0149824 A1 | 8/2004 | Miller et al. |
| 2004/0153370 A1 | 8/2004 | Yang |
| 2004/0158351 A1 | 8/2004 | Rivalto |
| 2004/0172260 A1 | 9/2004 | Junger et al. |
| 2004/0181310 A1 | 9/2004 | Stashluk, Jr. et al. |
| 2004/0199284 A1 | 10/2004 | Hara |
| 2004/0199656 A1 | 10/2004 | Pintsov |
| 2004/0211834 A1 | 10/2004 | Fleckenstein et al. |
| 2004/0215480 A1 | 10/2004 | Kadaba |
| 2004/0215588 A1 | 10/2004 | Cornelius |
| 2004/0254802 A1 | 12/2004 | Miller et al. |
| 2004/0254811 A1 | 12/2004 | Horstemeyer |
| 2004/0260470 A1 | 12/2004 | Rast |
| 2005/0004877 A1 | 1/2005 | McLellan et al. |
| 2005/0006470 A1 | 1/2005 | Mrozik et al. |
| 2005/0027607 A1 | 2/2005 | Pearson |
| 2005/0038758 A1 | 2/2005 | Hilbush et al. |
| 2005/0060164 A1 | 3/2005 | Eli Berl Illion |
| 2005/0060228 A1 | 3/2005 | Woo |
| 2005/0061877 A1 | 3/2005 | Stevens |
| 2005/0068178 A1 | 3/2005 | Lee et al. |
| 2005/0071258 A1 | 3/2005 | Kumakawa |
| 2005/0075989 A1 | 4/2005 | Biasi et al. |
| 2005/0080635 A1 | 4/2005 | Groff et al. |
| 2005/0080638 A1 | 4/2005 | Maseruka |
| 2005/0104716 A1 | 5/2005 | Simms et al. |
| 2005/0116033 A1 | 6/2005 | Moore |
| 2005/0119786 A1 | 6/2005 | Kadaba |
| 2005/0120003 A1 | 6/2005 | Drury et al. |
| 2005/0131774 A1 | 6/2005 | Huxter |
| 2005/0137901 A1 | 6/2005 | Siegel |
| 2005/0138382 A1 | 6/2005 | Hougaard et al. |
| 2005/0149372 A1 | 7/2005 | Kite et al. |
| 2005/0216553 A1 | 9/2005 | Mallonee et al. |
| 2005/0218222 A1 | 10/2005 | Nark et al. |
| 2005/0234911 A1 | 10/2005 | Hess et al. |
| 2005/0251402 A1 | 11/2005 | Olsen et al. |
| 2006/0010037 A1 | 1/2006 | Angert |

(56) References Cited

U.S. PATENT DOCUMENTS

| | | |
|---|---|---|
| 2006/0010077 A1 | 1/2006 | Dohrmann et al. |
| 2006/0020366 A1 | 1/2006 | Bloom |
| 2006/0020489 A1 | 1/2006 | Rivalto |
| 2006/0041481 A1 | 2/2006 | Stowe |
| 2006/0047610 A1 | 3/2006 | Parkos et al. |
| 2006/0069601 A1 | 3/2006 | Simon et al. |
| 2006/0085273 A1 | 4/2006 | Mayer et al. |
| 2006/0097896 A1 | 5/2006 | Jones |
| 2006/0149577 A1 | 7/2006 | Stashluk et al. |
| 2006/0224512 A1 | 10/2006 | Kurakata |
| 2006/0229895 A1 | 10/2006 | Kodger |
| 2006/0235739 A1 | 10/2006 | Levis et al. |
| 2006/0238334 A1 | 10/2006 | Mangan et al. |
| 2006/0282277 A1 | 12/2006 | Ng |
| 2006/0287870 A1 | 12/2006 | Mayer et al. |
| 2007/0005452 A1 | 1/2007 | Klingenberg et al. |
| 2007/0016538 A1 | 1/2007 | Bielefeld et al. |
| 2007/0036117 A1 | 2/2007 | Taube et al. |
| 2007/0047459 A1 | 3/2007 | Kadaba |
| 2007/0062851 A1 | 3/2007 | Schulz et al. |
| 2007/0078797 A1 | 4/2007 | Won et al. |
| 2007/0083410 A1 | 4/2007 | Hanna |
| 2007/0095904 A1 | 5/2007 | Barta et al. |
| 2007/0124295 A1 | 5/2007 | Forman et al. |
| 2007/0143281 A1 | 6/2007 | Smirin et al. |
| 2007/0150533 A1 | 6/2007 | Krause et al. |
| 2007/0156415 A1 | 7/2007 | Foth et al. |
| 2007/0185598 A1 | 8/2007 | Ortega |
| 2007/0192191 A1 | 8/2007 | Neal et al. |
| 2007/0198290 A1 | 8/2007 | Kinory et al. |
| 2007/0266081 A1 | 11/2007 | Murchison et al. |
| 2008/0004928 A1 | 1/2008 | Trellevik et al. |
| 2008/0004957 A1 | 1/2008 | Hildreth et al. |
| 2008/0004967 A1 | 1/2008 | Gillen |
| 2008/0004995 A1 | 1/2008 | Klingenberg et al. |
| 2008/0040246 A1 | 2/2008 | Fukamachi |
| 2008/0051995 A1 | 2/2008 | Lokshin et al. |
| 2008/0061966 A1 | 3/2008 | Nelson |
| 2008/0082346 A1 | 4/2008 | Hoopes et al. |
| 2008/0109246 A1 | 5/2008 | Russell |
| 2008/0121682 A1 | 5/2008 | Grim et al. |
| 2008/0133261 A1 | 6/2008 | Ray |
| 2008/0154781 A1 | 6/2008 | Kumar |
| 2008/0172305 A1 | 7/2008 | Estes et al. |
| 2008/0210749 A1 | 9/2008 | Skaaksrud et al. |
| 2008/0221913 A1 | 9/2008 | Cook et al. |
| 2008/0249830 A1 | 10/2008 | Gilman et al. |
| 2008/0313018 A1 | 12/2008 | Kamm, IV et al. |
| 2008/0319970 A1 | 12/2008 | Gamer et al. |
| 2008/0320092 A1 | 12/2008 | Campbell et al. |
| 2009/0001153 A1 | 1/2009 | Lim |
| 2009/0012802 A1 | 1/2009 | Pinney |
| 2009/0043552 A1 | 2/2009 | Tomlinson, Jr. et al. |
| 2009/0046892 A1 | 2/2009 | Avant et al. |
| 2009/0063215 A1 | 3/2009 | Heise et al. |
| 2009/0076888 A1 | 3/2009 | Oster et al. |
| 2009/0106124 A1 | 4/2009 | Yang |
| 2009/0138730 A1 | 5/2009 | Cook et al. |
| 2009/0146832 A1 | 6/2009 | Ebert et al. |
| 2009/0164295 A1 | 6/2009 | Sion |
| 2009/0173672 A1 | 7/2009 | Avant et al. |
| 2009/0187489 A1 | 7/2009 | Mallick et al. |
| 2009/0240597 A1 | 9/2009 | Oswald |
| 2009/0259509 A1 | 10/2009 | Landvater |
| 2009/0281929 A1 | 11/2009 | Boitet et al. |
| 2009/0314835 A1 | 12/2009 | Jackson |
| 2009/0319078 A1 | 12/2009 | Jackson |
| 2009/0326971 A1 | 12/2009 | Piccinini et al. |
| 2010/0004960 A1 | 1/2010 | Frankenberg et al. |
| 2010/0011238 A1 | 1/2010 | Nakamura et al. |
| 2010/0012769 A1 | 1/2010 | Alber et al. |
| 2010/0049536 A1 | 2/2010 | Quine et al. |
| 2010/0057592 A1 | 3/2010 | Moir et al. |
| 2010/0057593 A1 | 3/2010 | Moir et al. |
| 2010/0076903 A1 | 3/2010 | Klingenberg et al. |
| 2010/0100497 A1 | 4/2010 | Kuebert et al. |
| 2010/0114678 A1 | 5/2010 | Axe et al. |
| 2010/0121689 A1 | 5/2010 | Wallace et al. |
| 2010/0138281 A1 | 6/2010 | Zhang et al. |
| 2010/0162149 A1 | 6/2010 | Sheleheda et al. |
| 2010/0185565 A1 | 7/2010 | Wade |
| 2010/0211444 A1 | 8/2010 | Spear |
| 2010/0223127 A1 | 9/2010 | Bettez et al. |
| 2010/0223134 A1 | 9/2010 | Lunenfeld |
| 2010/0235290 A1 | 9/2010 | Junger et al. |
| 2010/0250291 A1 | 9/2010 | Walker et al. |
| 2010/0280955 A1 | 11/2010 | Ross et al. |
| 2011/0004562 A1 | 1/2011 | Hennessy et al. |
| 2011/0084162 A1 | 4/2011 | Goossen et al. |
| 2011/0093361 A1 | 4/2011 | Morales |
| 2011/0125665 A1 | 5/2011 | Kadaba |
| 2011/0153513 A1 | 6/2011 | Erie et al. |
| 2011/0191697 A1 | 8/2011 | Sumner et al. |
| 2011/0246323 A1 | 10/2011 | Mehta et al. |
| 2011/0270714 A1 | 11/2011 | Myrick et al. |
| 2011/0287748 A1 | 11/2011 | Angel et al. |
| 2011/0288896 A1 | 11/2011 | Dewey, Jr. et al. |
| 2012/0016948 A1 | 1/2012 | Sinha |
| 2012/0030124 A1 | 2/2012 | Cronkright, II et al. |
| 2012/0030133 A1 | 2/2012 | Rademaker |
| 2012/0047084 A1 | 2/2012 | Naghshineh et al. |
| 2012/0047085 A1 | 2/2012 | Naghshineh et al. |
| 2012/0062362 A1 | 3/2012 | Rudduck et al. |
| 2012/0089532 A1 | 4/2012 | Kuebert et al. |
| 2012/0095934 A1 | 4/2012 | Klingenberg et al. |
| 2012/0130625 A1 | 5/2012 | Srivastava |
| 2012/0130916 A1 | 5/2012 | Neal et al. |
| 2012/0166320 A1 | 6/2012 | Junger |
| 2012/0179622 A1 | 7/2012 | Amato |
| 2012/0185363 A1 | 7/2012 | Gilbert |
| 2012/0235786 A1 | 9/2012 | Rudduck et al. |
| 2012/0246077 A1 | 9/2012 | Skaaksrud et al. |
| 2012/0303539 A1 | 11/2012 | Marcus et al. |
| 2012/0303541 A1 | 11/2012 | Marcus et al. |
| 2012/0303542 A1 | 11/2012 | Marcus et al. |
| 2012/0310853 A1 | 12/2012 | Aldstadt |
| 2012/0330774 A1 | 12/2012 | Sadot et al. |
| 2013/0006731 A1 | 1/2013 | Cook et al. |
| 2013/0006885 A1 | 1/2013 | Kuebert et al. |
| 2013/0013101 A1 | 1/2013 | Bonnell et al. |
| 2013/0013102 A1 | 1/2013 | Bonnell et al. |
| 2013/0013350 A1 | 1/2013 | McCullough et al. |
| 2013/0016636 A1 | 1/2013 | Berger et al. |
| 2013/0018894 A1 | 1/2013 | Qiao |
| 2013/0018999 A1 | 1/2013 | Merrill et al. |
| 2013/0024307 A1 | 1/2013 | Fuerstenberg et al. |
| 2013/0054054 A1 | 2/2013 | Tollenaere et al. |
| 2013/0061337 A1 | 3/2013 | Zimberoff et al. |
| 2013/0073336 A1 | 3/2013 | Heath |
| 2013/0073605 A1 | 3/2013 | Fosburgh et al. |
| 2013/0088323 A1 | 4/2013 | Ryan |
| 2013/0144428 A1 | 6/2013 | Irwin et al. |
| 2013/0151419 A1 | 6/2013 | Hitchcock et al. |
| 2013/0166067 A1 | 6/2013 | Irwin et al. |
| 2013/0173484 A1 | 7/2013 | Wesby |
| 2013/0202185 A1 | 8/2013 | Irwin, Jr. et al. |
| 2013/0238599 A1 | 9/2013 | Burris |
| 2013/0238658 A1 | 9/2013 | Burris |
| 2013/0246396 A1 | 9/2013 | Clare et al. |
| 2013/0262311 A1 | 10/2013 | Buhrmann et al. |
| 2013/0262336 A1 | 10/2013 | Wan et al. |
| 2013/0268437 A1 | 10/2013 | Desai et al. |
| 2013/0338822 A1 | 12/2013 | Gibson, Jr. et al. |
| 2014/0034727 A1 | 2/2014 | Hancock et al. |
| 2014/0035721 A1 | 2/2014 | Heppe et al. |
| 2014/0052661 A1 | 2/2014 | Shakes et al. |
| 2014/0081677 A1 | 3/2014 | Craig et al. |
| 2014/0180959 A1 | 6/2014 | Gillen et al. |
| 2014/0222711 A1 | 8/2014 | Tibbs et al. |
| 2014/0236688 A1 | 8/2014 | Minter et al. |
| 2014/0258098 A1 | 9/2014 | Felix et al. |
| 2014/0278602 A1 | 9/2014 | Lievens et al. |
| 2014/0278603 A1 | 9/2014 | Lievens et al. |
| 2014/0278843 A1 | 9/2014 | Lievens et al. |

(56) References Cited

U.S. PATENT DOCUMENTS

| | | | |
|---|---|---|---|
| 2014/0279648 A1 | 9/2014 | Whitehouse | |
| 2014/0279650 A1 | 9/2014 | Lievens et al. | |
| 2014/0279654 A1 | 9/2014 | Lievens et al. | |
| 2014/0279658 A1 | 9/2014 | Lievens et al. | |
| 2014/0279663 A1 | 9/2014 | Lievens et al. | |
| 2014/0279664 A1 | 9/2014 | Lievens et al. | |
| 2014/0279665 A1 | 9/2014 | Lievens et al. | |
| 2014/0279666 A1 | 9/2014 | Lievens et al. | |
| 2014/0279667 A1* | 9/2014 | Gillen | G06Q 10/0836 705/339 |
| 2014/0330407 A1* | 11/2014 | Corder | G06Q 10/0631 700/90 |
| 2014/0330603 A1 | 11/2014 | Corder et al. | |
| 2015/0058163 A1 | 2/2015 | Lenahan et al. | |
| 2015/0088694 A1 | 3/2015 | Ackerman | |
| 2015/0088731 A1 | 3/2015 | Ackerman | |
| 2015/0106291 A1 | 4/2015 | Robinson et al. | |
| 2015/0106292 A1 | 4/2015 | Robinson et al. | |
| 2015/0106293 A1 | 4/2015 | Robinson et al. | |
| 2015/0106294 A1 | 4/2015 | Robinson et al. | |
| 2015/0106295 A1 | 4/2015 | Robinson et al. | |
| 2015/0106296 A1* | 4/2015 | Robinson | G06F 21/62 705/339 |
| 2015/0120602 A1 | 4/2015 | Huffman et al. | |
| 2015/0138382 A1 | 5/2015 | Xiao et al. | |
| 2015/0193731 A1 | 7/2015 | Stevens et al. | |
| 2015/0356801 A1 | 12/2015 | Nitu et al. | |
| 2016/0071051 A1 | 3/2016 | Tibbs et al. | |
| 2016/0140486 A1 | 5/2016 | Tibbs et al. | |
| 2016/0140487 A1 | 5/2016 | Tibbs et al. | |
| 2016/0148154 A1 | 5/2016 | Tibbs et al. | |
| 2016/0189466 A1 | 6/2016 | Gibson et al. | |
| 2017/0148059 A1 | 5/2017 | Minter et al. | |
| 2017/0150304 A1 | 5/2017 | Baldasare et al. | |
| 2017/0154483 A1 | 6/2017 | Cordiner et al. | |
| 2017/0353943 A1* | 12/2017 | Skaaksrud | H04W 12/06 |
| 2018/0005184 A1 | 1/2018 | Schenken | |
| 2018/0025319 A1 | 1/2018 | Lievens et al. | |
| 2018/0060800 A1 | 3/2018 | Robinson | |
| 2018/0253688 A1 | 9/2018 | Schenken et al. | |
| 2019/0172011 A1 | 6/2019 | Robinson et al. | |
| 2019/0354918 A1 | 11/2019 | Tibbs et al. | |

FOREIGN PATENT DOCUMENTS

| | | |
|---|---|---|
| CN | 1317758 A | 10/2001 |
| CN | 1432946 A | 7/2003 |
| CN | 1571975 A | 1/2005 |
| CN | 1666214 A | 9/2005 |
| CN | 1795461 A | 6/2006 |
| CN | 101203873 A | 6/2008 |
| CN | 101329752 A | 11/2008 |
| CN | 101491051 A | 7/2009 |
| CN | 101971201 A | 2/2011 |
| CN | 102609783 A | 7/2012 |
| CN | 102930655 A | 2/2013 |
| CN | 202720725 U | 2/2013 |
| CN | 103310323 A | 9/2013 |
| CN | 103345791 A | 10/2013 |
| CN | 203232495 U | 10/2013 |
| EP | 1152356 A2 | 11/2001 |
| EP | 1365198 A1 | 11/2003 |
| EP | 2469291 A1 | 6/2012 |
| EP | 2973202 A1 | 1/2016 |
| GB | 2528818 A | 2/2016 |
| JP | 5-211684 A | 8/1993 |
| JP | H10207956 A | 8/1998 |
| JP | 11139540 A | 5/1999 |
| JP | H11151154 A | 6/1999 |
| JP | 2000339373 A | 12/2000 |
| JP | 200114393 A | 1/2001 |
| JP | 200122678 A | 1/2001 |
| JP | 2001-282974 A | 10/2001 |
| JP | 2001291027 A | 10/2001 |
| JP | 2001338030 A | 12/2001 |
| JP | 200256307 A | 2/2002 |
| JP | 2002042008 A | 2/2002 |
| JP | 2002092505 A | 3/2002 |
| JP | 2002-109409 A | 4/2002 |
| JP | 2002157541 A | 5/2002 |
| JP | 2002259553 A | 9/2002 |
| JP | 2003196354 A | 7/2003 |
| JP | 2003263599 A | 9/2003 |
| JP | 2003321124 A | 11/2003 |
| JP | 2004-30159 A | 1/2004 |
| JP | 2004280468 A | 10/2004 |
| JP | 2004338824 A | 12/2004 |
| JP | 2005-43974 A | 2/2005 |
| JP | 2006-512635 A | 4/2006 |
| JP | 2006277199 A | 10/2006 |
| JP | 2007153618 A | 6/2007 |
| JP | 2008-542886 A | 11/2008 |
| JP | 2008303069 A | 12/2008 |
| JP | 2010128535 A | 6/2010 |
| JP | 2011118611 A | 6/2011 |
| JP | 2012138000 A | 7/2012 |
| KR | 2001-0093768 A | 10/2001 |
| WO | 00/19170 A1 | 4/2000 |
| WO | 0019171 A1 | 4/2000 |
| WO | 0030014 A1 | 5/2000 |
| WO | 0046726 A2 | 8/2000 |
| WO | 0046728 A2 | 8/2000 |
| WO | 0052422 A1 | 9/2000 |
| WO | 01/08071 A1 | 2/2001 |
| WO | 0116889 A1 | 3/2001 |
| WO | 0120423 A2 | 3/2001 |
| WO | 0129778 A1 | 4/2001 |
| WO | 0135344 A2 | 5/2001 |
| WO | 0139031 A2 | 5/2001 |
| WO | 0165451 A1 | 9/2001 |
| WO | 0165454 A2 | 9/2001 |
| WO | 0165523 A1 | 9/2001 |
| WO | 0165524 A1 | 9/2001 |
| WO | 0167344 A1 | 9/2001 |
| WO | 0172109 A2 | 10/2001 |
| WO | 0184359 A2 | 11/2001 |
| WO | 0188831 A2 | 11/2001 |
| WO | 0197101 A2 | 12/2001 |
| WO | 0207104 A1 | 1/2002 |
| WO | 0217045 A2 | 2/2002 |
| WO | 02052378 A2 | 7/2002 |
| WO | 02073369 A2 | 9/2002 |
| WO | 02080436 A2 | 10/2002 |
| WO | 03023688 A2 | 3/2003 |
| WO | 03040979 A1 | 5/2003 |
| WO | 2004015518 A2 | 2/2004 |
| WO | 2004042523 A2 | 5/2004 |
| WO | 2007055769 A2 | 5/2007 |
| WO | 2010123611 A1 | 10/2010 |
| WO | 2011/074500 A1 | 6/2011 |
| WO | 2012129529 A1 | 9/2012 |
| WO | 2013106940 A1 | 7/2013 |
| WO | 2014031691 A2 | 2/2014 |
| WO | 2014/142951 A1 | 9/2014 |
| WO | 2014/164825 A2 | 10/2014 |
| WO | 2014/164839 A2 | 10/2014 |
| WO | 2014164853 A2 | 10/2014 |
| WO | 2016/027178 A1 | 2/2016 |

OTHER PUBLICATIONS

Raco Industries, "Increase Delivery Visibility and Simplify Your Process," retrieved from <http://www.racointeractive.com/media/834/raco_interactive-pd.pdf>, on Sep. 25, 2013, 2 pages.

SEP leads €26 million funding round for Kiala, http://www.sep.co.uk/news/story/sep-leads-e26-million-funding-round-for-kiala-2/, Nov. 30, 2007, SEP Scottish Equity Partners.

Van Huzien, Gordon, Messaging: The Transport Part of The XML Puzzle, Article, Jul. 2000 (Retrieved from the Internet Apr. 25, 2003: <URL:http://www-106.ibm.com/developerworks/library/xml-messaging/>.

(56) References Cited

OTHER PUBLICATIONS

ASP V16-System Walker List Works Manual (relevant part); p. 88, line 5, 3.4 Start up and termination of Lis! WORKS writer; one page.
Brewin, Bob and Rosencrance, Linda, Follow That Package!, Article, Mar. 19, 2001 (Retrieved from the Internet Apr. 25, 2003), p. 1-p. 5, Retrieved from the Internet: URL:http://www.computerworld.com./printth is/200 1/0,4814,58696, DO .him l, Computer World.
Caminiti et al., United Parcel Service Introduces Advanced Label Imaging System, Published by Business Wire on Nov. 29, 1989, Section 1, p. 1, Downloaded from the Internet on Sep. 19, 2005, 2 Pages.
De Marco, Donna, E-Tail Presents Can Be Tougher to Send Back Than Order, Journal, Dec. 28, 1999, Downloaded from the Internet on Oct. 3, 2002, Accession No. 08891512, Knight-Ridder/Tribune Business News, The Dialog Corporation, United States.
Descartes, Scheduling Software Helps Webvan Meet 3D-Minute Delivery Window, www.stores.org, Jul. 2000.
EL Portal Del Transporte, Fed Ex Insight Empowers Customers with Enhanced Shipment Visibility and Control, Article, Apr. 11, 2001 (Retrieved on Apr. 25, 2003), p. 9, Paragraph 4-p. 10, Line 7, Retrieved from the Internet: (U RL:http://www. transportando.nel/newsabri 1_ completa .him>.
Fed Ex, "RPS Adds Automated Package Pick-Up to Redesigned Web Site," www.fedex.com/us/aboul/gound/www.fedex.com/us/aboul/gound/ pressreleases/pressrelease111198.hlml?link=4, retrieved Sep. 10, 2003.
Fedex, "Fed Ex Mobile Ship", retrieved from <hllp:l/www.fedex.com/us/mobile/label.hlml, redirected to http://mobilesolutions.fedex.com/shipping-label.hlml> on Sep. 25, 2013, 2 pages.
Frontline Solutions, Fed Ex Improves Internal, External Operations, Article, Apr. 5, 2001 (Retrieved from the Internet Apr. 25, 2003), p. 1 (last line) through p. 2, Paragraph 9, Retrieved from the Internet: <URL:http://www.frontlinemagazine.com/art_lh/o4052001.hlx>, Fairfax, Virginia and Memphis, Tennessee.
Gao, Huiji, et al., "Cyber-Physical-Social Systems: Harnessing the Crowdsourcing Power of Social Media for Disaster Relief", IEEE Intelligent Systems, Copyright 2011, pp. 10-14, IEEE Computer Society.
Harrington, Lisa, The U.S. Postal Service Gets Serious About Serving Business in the New Economy, Journal, May 2000, Downloaded from the Internet on Oct. 3, 2002, p. 2, vol. 41, No. 5, Accession No. 01167257, Penton Publishing, Inc., United States of America.
Henderson, Timothy, Buy.com Boosts Returns Process Efficiency With New Solution, Periodical, Nov. 2000, Downloaded from the Internet on Oct. 3, 2002, pp. 72-76, vol. 82n11, Accession No. 02102731, ProQuest Info&Learning, United States of America.
IPventure, "Schedule Distribution Routes and Timeslots," http://wvvw.ipventure.com/onlineorder/distribution.php, retrieved on Apr. 16, 2008.
Kihon Kara Jissen Made Business Seikou No Tameno Kanpeki Guide—How to E-Commerce (relevant part); p. 60; one page.
Many Happy Returns—UPS Unvels Advanced Outline Returns Solution, Journal, Sep. 20, 2000, Downloaded from the Internet on Oct. 3, 2002, Accession No. 12921102, Business Wire, United States of America.
Outlook 2000 Handbook First Edition (relevant part); p. 95, last 9 lines; one page.
Lindsay, Bruce R., "Congressional Research Service, Social Media and Disasters: Current Uses, Future Options, and Policy Considerations," CRS Report for Congress, Sep. 6, 2011, 10 pages, Congressional Research Service.
Non-Final Office Action received for U.S. Appl. No. 14/514,228, dated Nov. 30, 2018, 45 pages.
Office Action received for Canadian Patent Application No. 2,905,338, dated Oct. 2, 2018, 8 pages.
Non-Final Office Action received for U.S. Appl. No. 14/942,757, dated Jul. 19, 2018, 25 pages.

McNamara, Paul, "'Doorman' Kiosk Accepts Package Deliveries When You're Not Home", Network world, Available at: <https://www.networkworld.com/article/2348365/data-center/-doorman--kiosk-accepts-package-deliveries-when-you-re-not-home.html>, Aug. 8, 2007, 4 pages.
Notice of Allowance received for Singapore Patent Application No. 11201507531R, dated Jul. 19, 2018, 7 pages.
Final Office Action received for U.S. Appl. No. 14/514,000, dated Feb. 12, 2018, 43 pages.
Final Office Action received for U.S. Appl. No. 14/514,155, dated Oct. 20, 2016, 18 pages.
International Preliminary Report on Patentability received for PCT Patent Application No. PCT/US2014/060525, completed on Dec. 10, 2015, 12 pages.
Non-Final Office Action received for U.S. Appl. No. 14/514,155, dated Jun. 11, 2018, 23 pages.
Non-Final Office Action received for U.S. Appl. No. 14/561,041, dated Mar. 30, 2018, 57 pages.
Non-Final Office Action received for U.S. Appl. No. 14/935,257, dated Apr. 20, 2017, 16 pages.
Non-Final Office Action received for U.S. Appl. No. 14/200,681, dated Jul. 25, 2016, 17 pages.
Office Action received for European Patent Application No. 14714534.6, dated May 26, 2017, 5 pages.
Office Action received for Japanese Patent Application No. 2016-501276, dated Nov. 1, 2016, 8 pages (4 pages of English Translation and 4 pages of Official Copy).
Office Action received for Japanese Patent Application No. 2016-501288, dated Nov. 1, 2016, 7 pages (3 pages of English Translation and 4 pages of Official copy).
Search Report and Written Opinion received for Singapore Patent Application No. 11201507531R, dated Jun. 27, 2016, 11 pages.
Search Report and Written Opinion received for Singapore Patent Application No. 11201507549S, dated May 31, 2016, 11 pages.
Summons to Attend Oral Proceedings received for European Patent Application No. 14854011.5, dated Apr. 3, 2018, 13 pages.
Notice of Allowance received for Singapore Patent Application No. 11201507536Q, dated Jul. 27, 2017, 6 pages.
Office Action received for Chinese Patent Application No. 201480026776.9, dated Jul. 4, 2017, 9 Pages (Official Copy Only) (See attached Communication 37 CFR § 1.98(a) (3)).
Office Action received for Japanese Patent Application No. 2016-501276, dated Jun. 27, 2017, 5 pages (Official Copy Only) (See attached Communication 37 CFR § 1.98(a) (3)).
Office Action received for Japanese Patent Application No. 2016-501304, dated Aug. 29, 2017, 4 Pages (Official Copy Only) (See attached Communication 37 CFR § 1.98(a) (3)).
Office Action received for Japanese Patent Application No. 2017-174116, dated Aug. 14, 2018, 3 Pages ( Official Copy Only) (See attached Communication 37 CFR § 1.98(a) (3)).
Non-Final Office Action received for U.S. Appl. No. 14/514,155, dated Sep. 28, 2018, 29 pages.
Notice of Allowance received for U.S. Appl. No. 14/514,276, dated Oct. 3, 2018, 11 pages.
Office Action received for Chinese Patent Application No. 201480026789.6, dated Jul. 23, 2018, 17 pages (Official Copy Only) (See attached Communication 37 CFR § 1.98(a) (3)).
Notice of Allowance received for U.S. Appl. No. 14/200,432, dated Feb. 7, 2019, 22 pages.
Final Office Action received for U.S. Appl. No. 14/942,757, dated Mar. 21, 2019, 26 pages.
Office Action received for Chinese Patent Application No. 201480067863.9, dated Dec. 24, 2018, 39 pages (15 pages of English Translation and 24 pages of Official Copy).
Chung et al., "Optimal Replenishment Policies for EOQ Inventory Model with Limited Storage Capacity Under Permissible Delay in Payments", Opsearch 41.1, 2004, 23 pages.
FedEx, "Mobile Shipping Label", Available online at: <www.mobilesolutions.fedex.com/shipping-label.html>, Retrieved on Sep. 25, 2013, pp. 1-2.
Notice of Allowance received for U.S. Appl. No. 14/170,298, dated May 22, 2019, 10 pages.

(56) References Cited

OTHER PUBLICATIONS

Notice of Allowance received for U.S. Appl. No. 14/942,697, dated Apr. 24, 2019, 18 pages.
Non-Final Office Action received for U.S. Appl. No. 15/252,629, dated Jul. 23, 2019, 21 pages.
Non-Final Office Action received for U.S. Appl. No. 15/706,442, dated Jul. 29, 2019, 9 pages.
Office Action received for Australian Patent Application No. 2014248927, dated Aug. 13, 2019, 6 pages.
Guler, N., "Containerization and Terminal Area Requirements", Istanbul Technical University, Maritime Faculty, Available online at <URL:https://hrcak.srce.hr/file/82785>, Jul. 2002, 20 pages.
Office Action received for Canadian Patent Application No. 2,905,763, dated Jun. 18, 2019, 7 pages.
Notice of Allowance received for U.S. Appl. No. 15/974,291, dated Aug. 22, 2019, 11 pages.
Final Office Action received for U.S. Appl. No. 14/514,155, dated Jun. 21, 2019, 28 pages.
Office Action received for Chinese Patent Application No. 201480067815.X, dated Aug. 21, 2019, 11 pages (6 pages of English Translation and 5 pages of Official copy).
Office Action received for Malaysian Patent Application No. PI2015002361, dated Oct. 24, 2019, 4 pages.
Office Action received for Malaysian Patent Application No. PI2015002356, dated Nov. 8, 2019, 3 pages.
Office Action received for UAE Patent Application No. 1223/2015, dated Nov. 20, 2019, 11 pages.
Non-Final Office Action received for U.S. Appl. No. 14/200,724, dated Oct. 18, 2019, 17 pages.
Otto et al., "A Framework for Cyber-Enhanced Retailing: Integrating e-Commerce Retailing with Brick-and-Mortar Retailing", Electronic Markets, vol. 10, No. 3, 2000, pp. 1-7.
Non-Final Office Action received for U.S. Appl. No. 15/711,127, dated Jan. 6, 2020, 10 pages.
Non-Final Office Action received for U.S. Appl. No. 14/561,062, dated Jan. 22, 2020, 44 pages.

\* cited by examiner

SYSTEMS AND METHODS FOR SYNCHRONIZING DELIVERY OF RELATED PARCELS VIA A COMPUTERIZED LOCKER BANK

BACKGROUND

The continued growth of e-commerce and the resultant increase in parcel delivery volume has led to increased challenges related to the last leg of parcel delivery (e.g., 'the last mile problem'). Generally, for common carriers, parcel delivery comprises a series of segments between an origin location and a destination location. Points between these segments may include, for example, a pick-up location, intermediate hub, destination hub, and delivery address. The final segment in delivery of a parcel typically includes a segment between a destination hub and the delivery address of the parcel. Challenges related to the final segment may arise when a consignee is not present at the delivery address to take delivery of the parcel. This may, for example, cause the common carrier to make multiple trips to the same delivery address to successfully deliver the item. Each additional trip to the delivery address may have an added associated cost that the common carrier must bear. Accordingly, there is a need for improved systems and processes for addressing these challenges.

SUMMARY OF THE VARIOUS EMBODIMENTS

A direct-to-locker bank delivery system, in various embodiments, comprises a computerized locker bank and one or more remote logistics servers comprising one or more processors and memory. In particular embodiments, the computerized locker bank comprises a plurality of selectively securable locker compartments, each of the plurality of selectively securable locker compartments comprising one or more doors and one or more locking mechanisms; and one or more locker bank computers comprising one or more processors and memory. In some embodiments, the memory stores: (1) first package level detail information for a first parcel, the first package level detail information comprising data associated with a first consignee; and (2) one or more pieces of package level detail information for one or more parcels currently stored at the computerized locker bank, wherein the one or more pieces of package level detail information comprise, for each respective parcel of the plurality of parcels, consignee information for the respective parcel. In particular embodiments, the one or more processors are configured to: (1) receive an indication that the first parcel is scheduled for delivery at a primary delivery location; (2) determine whether the one or more parcels currently stored at the computerized locker bank comprise one or more second parcels associated with the first parcel based on the one or more pieces of package level detail information for the one or more parcels currently stored at the computerized locker bank and the first package level detail information; (3) in response to determining that the one or more parcels currently stored at the computerized locker bank comprise the one or more second parcels, route the first parcel to the computerized locker bank without attempting delivery of the first parcel at the primary delivery location; (4) receive a request to deliver the first parcel to the computerized locker bank; and (5) in response to receiving the request, operate the one or more locking mechanisms on a particular one of the plurality of selectively securable locker compartments to open the one or more doors.

In various embodiments, determining whether the one or more parcels currently stored at the computerized locker bank comprise one or more second parcels associated with the first parcel comprises determining whether any of the one or more parcels currently stored at the computerized locker bank have a consignee selected from a group consisting of: (1) a neighbor of the first consignee; (2) an individual that shares the primary delivery address with the first consignee; and (3) the first consignee.

In still further embodiments, the first package level detail information further comprises one or more dimensions of the first parcel; and the one or more pieces of package level detail information for the one or more parcels currently stored at the computerized locker bank further comprise, for each respective parcel of the plurality of parcels, one or more dimensions of the respective parcel. In such embodiments, the one or more processors may be further configured to: (1) determine, based on the one or more dimensions of the first parcel and one or more dimensions of the one or more second parcels, whether a particular one of the plurality of selectively securable locker compartments is sufficiently large to accommodate both the first parcel and the one or more second parcels; and (2) in response to determining that the particular one of the plurality of selectively securable locker compartments is sufficiently large to accommodate both the first parcel and the one or more second parcels, facilitate placement of the first parcel and the one or more second parcels in the particular one of the plurality of selectively securable locker compartments.

A computer-implemented method of facilitating delivery of a first parcel to a locker bank, in various embodiments, comprises: (1) receiving, by one or more processors, at a logistics server, a request to deliver a first parcel to a first location; (2) at least partially in response to receiving the request, determining, by one or more processors, for at least one second location, whether one or more second parcels currently stored at the at least one second location are associated with the first parcel, wherein the at least one second location comprises a locker bank; (3) in response to determining that the one or more second parcels are associated with the first parcel, routing, by one or more processors, the first parcel to the second location; (receiving, by one or more processors, a request to deliver the first parcel to the computerized locker bank at the second location; and (4) in response to receiving the request, operating, by one or more processors, the one or more locking mechanisms on a particular one of the plurality of selectively securable locker compartments to open the one or more doors. In particular embodiments the locker bank comprises a plurality of selectively securable locker compartments, each of the plurality of selectively securable locker compartments comprising one or more doors and one or more locking mechanisms; and one or more locker bank computers comprising one or more processors and memory.

BRIEF DESCRIPTION OF THE DRAWINGS

Various embodiments of a system and method for synchronizing delivery of related parcels to a computerized locker bank are described below. In the course of this description, reference will be made to the accompanying drawings, which are not necessarily drawn to scale, and wherein.

DETAILED DESCRIPTION OF VARIOUS EMBODIMENTS

Figure 1:
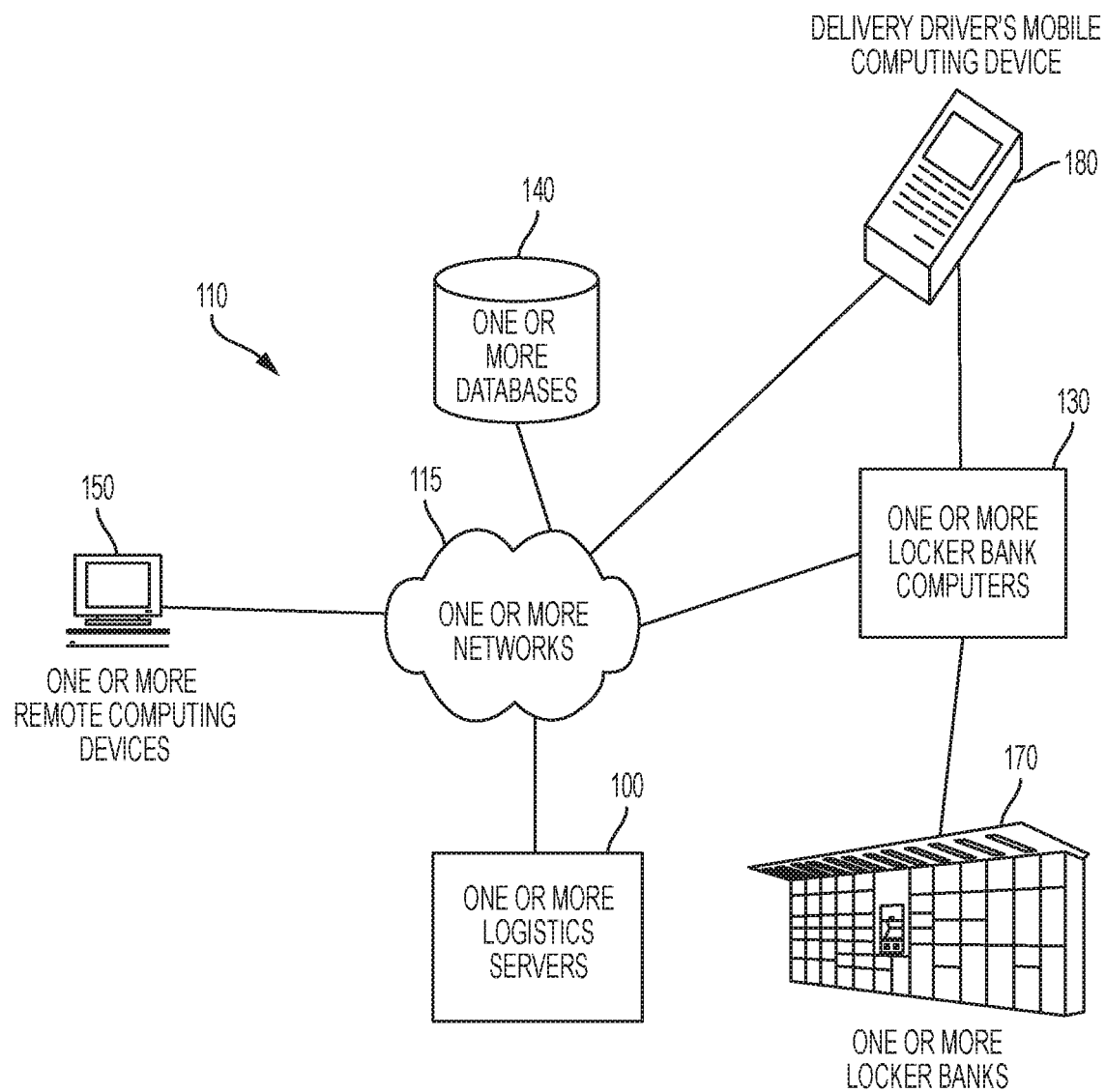
FIG. 1 is a block diagram of a synchronized delivery system in accordance with an embodiment of the present system.

Various embodiments now will be described more fully hereinafter with reference to the accompanying drawings. It should be understood that the invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Overview

In light of the 'last mile problem' and in the interest of conserving resources such as fuel, vehicle wear-and-tear, etc., logistics providers may desire to reduce a number of delivery attempts that a delivery driver must make as part of a last leg of delivery of a parcel (e.g., to a consignee's home or business). Reducing the number of delivery attempts may include, for example: (1) reducing a number of subsequent delivery attempts following an initial, unsuccessful delivery attempt; and/or (2) avoiding a need to make the initial delivery attempt at all. A logistics provider may utilize a synchronized delivery system in order to facilitate delivery of related parcels to a computerized locker bank for retrieval by a parcel consignee or another on behalf of the consignee in various situations such as, for example: (1) following an initial, unsuccessful delivery attempt at a primary delivery location (e.g., such as the consignee's home or business); or (2) directly from a delivery hub, in lieu of making an initial attempt to deliver the parcel at the primary delivery location.

In particular embodiments, the synchronized delivery system is configured to determine whether one or more conditions exist such that the logistics provider can deliver a parcel directly to a computerized locker bank in lieu of making any delivery attempt to the primary delivery location of the parcel. In various embodiments, the one or more conditions may include any suitable condition such as, for example: (1) a consignee associated with the parcel already has another parcel awaiting pick up at the computerized locker bank; (2) a third party that the consignee has authorized to pick up parcels on their behalf has a parcel awaiting pick up at the computerized locker bank; (3) one or more other parcels associated with the parcel in any other suitable way are awaiting pick up at the computerized locker bank; (4) a third party that the consignee has authorized to pick up parcels on their behalf has had a parcel redirected to a computerized locker bank; and/or the like. Generally, routing a parcel directly to a locker bank may enable the consignee or the third party to pick up both parcels (since they already need to make the trip) while also saving a logistics provider from having to make the delivery attempt at the primary delivery location.

As an example, a logistics provider may prefer to deliver a first parcel addressed to a particular consignee directly to a computerized locker bank rather than attempting delivery at the consignee's home when the consignee already has a second parcel at the computerized locker bank awaiting pick up by the consignee. Because, in this example, the consignee already needs to travel to the computerized locker bank to retrieve the second parcel, it may make sense to deliver the first parcel directly to the locker bank, so the consignee can pick up both the first parcel and the second parcel at the same time. This may avoid, for example, the logistics provider from making an unsuccessful delivery attempt at the consignee's home with the first parcel, only to have to then deliver the first parcel to the locker bank anyway.

In addition to avoiding unnecessary delivery attempts when a consignee himself or herself already has a parcel stored at a locker bank awaiting pickup, various embodiments of a synchronized delivery system may determine to deliver a parcel associated with a consignee directly to a computerized locker bank in lieu of attempting delivery of the parcel at the consignee's primary delivery address in response to determining that a third party, acting on behalf of the consignee, has a parcel stored at the locker bank awaiting pickup. A particular consignee may, for example, authorize one or more neighbors, roommates, friends, co-workers, etc. to pick up parcels on their behalf. In such embodiments, for example, a person may have authorized their neighbor to pick up parcels for them from a locker bank. The system may then (1) determine that a first parcel needs to be delivered to the person; (2) determine that the authorized third party already has a parcel at the locker bank awaiting pick up by the authorized third party; and (3) facilitate delivery of the first parcel directly to the locker bank in lieu of attempting delivery at the person's home address. The authorized third party may then be able to retrieve both their parcel and the person's parcel from the locker bank and deliver the person's parcel to them.

In various embodiments, a synchronized delivery system may be further configured for facilitating grouping of related parcels in a single locker at a locker bank. For example, the system may be configured to facilitate grouping a parcel addressed to a consignee that was delivered to a locker bank at a first time with a second parcel addressed to the consignee that was delivered to the locker bank at a later time. In various embodiments, this may reduce a number of lockers used for related parcels at a particular locker bank and further reduce a chance that the locker bank will become full and unable to accept new deliveries. In still further embodiments, the related parcels may include one or more parcels having a plurality of consignees. This may include, for example, facilitating grouping of parcels having consignees who have authorized each other to retrieve parcels from the locker bank on the other's behalf in a single locker. This grouping of parcels may ensure, for example, that related parcels are delivered in a 'synchronized' manner (e.g., to the same location or locker) such that a consignee or others on their behalf do not have parcels for retrieval at a plurality of different locations, or in a plurality of different lockers at the same location.

Exemplary Technical Platforms

As will be appreciated by one skilled in the relevant field, a system for synchronizing delivery of related parcels may be, for example, embodied as a computer system, a method, or a computer program product. Accordingly, various embodiments may take the form of an entirely hardware embodiment, an entirely software embodiment, or an embodiment combining software and hardware aspects. Furthermore, particular embodiments may take the form of a computer program product stored on a computer-readable storage medium having computer-readable instructions (e.g., software) embodied in the storage medium. Various embodiments may take the form of web, mobile, wearable computer-implemented, computer software. Any suitable computer-readable storage medium may be utilized including, for example, hard disks, compact disks, DVDs, optical storage devices, and/or magnetic storage devices.

Various embodiments are described below with reference to block diagrams and flowchart illustrations of methods, apparatuses (e.g., systems), and computer program products. It should be understood that each block of the block diagrams and flowchart illustrations, and combinations of blocks in the block diagrams and flowchart illustrations, respectively, can be implemented by a computer executing computer program instructions. These computer program instructions may be loaded onto a general purpose computer, special purpose computer, or other programmable data processing apparatus to produce a machine, such that the instructions which execute on the computer or other programmable data processing apparatus to create means for implementing the functions specified in the flowchart block or blocks.

These computer program instructions may also be stored in a computer-readable memory that can direct a computer or other programmable data processing apparatus to function in a particular manner such that the instructions stored in the computer-readable memory produce an article of manufacture that is configured for implementing the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of mechanisms for performing the specified functions, combinations of steps for performing the specified functions, and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and other hardware executing appropriate computer instructions.

Example System Architecture

FIG. 1 is a block diagram of a synchronized delivery system 110 according to a particular embodiment. As may be understood from this figure, the synchronized delivery system 110 includes one or more computer networks 115, one or more logistics servers 100, one or more databases 140, and one or more locker bank computers 130 operatively coupled to one or more locker banks 170 and optionally in direct, wireless communication with a delivery driver's mobile computing device 180. The synchronized delivery system 110 also, in the embodiment shown in this figure, includes one or more remote computing devices 150, such as a tablet computer, a desktop or laptop computer, a handheld computing device such as a smart phone, etc. In particular embodiments, the one or more computer networks 115 facilitate communication between the logistics server 100, one or more databases 140, one or more locker bank computers 130, one or more locker banks 170, one or more remote computing devices 150, and the delivery driver's mobile computing device 180.

In particular embodiments, the one or more remote computing devices 150 are configured to access the one or more databases 140 (e.g., via the one or more networks 115) to retrieve package level detail information (e.g., PLD information) for one or more parcels. The one or more remote computing devices 150 may, for example, enable a consignee to retrieve tracking information for one or more parcels that are currently scheduled for delivery to determine a delivery date/time, a delivery location, etc. The consignee may also use the one or more remote computing devices 150 to view changes in tracking information (e.g., such as when a parcel is routed from a primary delivery location to an alternate delivery location).

In various embodiments, the one or more locker banks 170 may include a network of computerized locker banks. For example, a particular network of computerized locker banks may server as alternate delivery locations for a particular area or region (e.g., such as a city or neighborhood). In various embodiments, a particular logistics provider may operate the network of locker banks. In other embodiments, a third party company may operate the network and enable one or more other logistics providers to utilize the one or more locker banks 170 within the network. In such embodiments, the synchronized delivery system 110 (e.g., or any of its components such as those shown in FIG. 1) may, for example, be configured to interface with one or more third party devices such as a third party computing device (not shown), a third party logistics server (not shown), etc.

The one or more computer networks 115 may include any of a variety of types of wired or wireless computer networks such as the Internet (or other WAN), a private intranet, a public switch telephone network (PSTN), a mesh network, or any other type of network (e.g., a network that uses Bluetooth (standard or low energy Bluetooth), beacon communication technologies (e.g., iBeacon), and/or near field communications to facilitate communication between computing devices). The communication link between the logistics server 100, database 140, one or more locker bank computers 130, one or more locker banks 170, one or more remote computing devices 150 and the delivery driver's mobile computing device 180 may be, for example, implemented via a Local Area Network (LAN) or via the Internet (or other WAN). In particular embodiments, a communication link (e.g., a wireless communication link) between the one or more locker bank computers 130 and the delivery driver's mobile computing device 180 may be implemented via beacon communication technologies or any other suitable communication link (e.g., Bluetooth, infrared, NFC, IEEE 802.15.4). In various embodiments, while the one or more locker bank computers 130 are in wireless communication (e.g., direct wireless communication) with the delivery driver's mobile computing device 180, the delivery driver's mobile computing device 180 may be configured to operate as an input device for the one or more locker bank computers 130. Exemplary interoperability of the delivery driver's mobile computing device 180 and the one or more locker bank computers 130 is described more fully in application Ser. No. 15/252,629, filed, Aug. 31, 2016, entitled, "LOCKER BANKS WITH AUTOMATICALLY OPENING DOORS", which is hereby incorporated by reference in its entirety.

Figure 2:
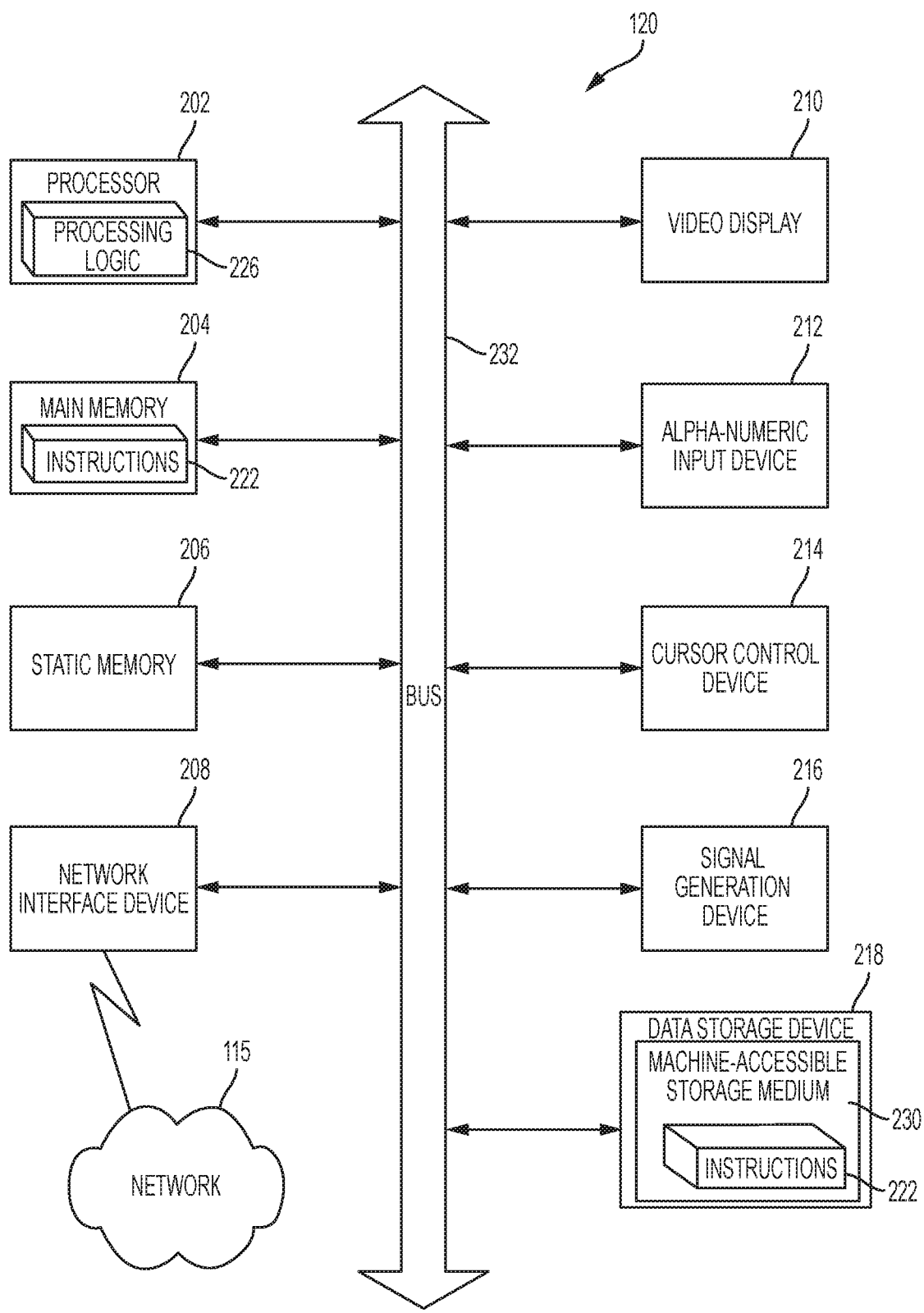
FIG. 2 is a schematic diagram of a computer, such as the logistics server of FIG. 1, that is suitable for use in various embodiments.

FIG. 2 illustrates a diagrammatic representation of a computer architecture 120 that can be used within the synchronized delivery system 110, for example, as a client computer (e.g., the delivery driver's mobile computing device 180 or the one or more remote computing devices 150 in FIG. 1), or as a server computer (e.g., the one or more logistics servers 100 shown in FIG. 1). In particular embodiments, the computer 120 may be suitable for use as a computer within the context of the synchronized delivery system 110 that is configured to facilitate routing of parcels to alternate delivery locations or facilitate the receipt and/or processing of parcels once they are delivered to the alternate delivery locations.

In particular embodiments, the computer 120 may be connected (e.g., networked) to other computers in a LAN, an intranet, an extranet, and/or the Internet. As noted above, the computer 120 may operate in the capacity of a server or a client computer in a client-server network environment, or as a peer computer in a peer-to-peer (or distributed) network environment. The computer 120 may be a personal computer (PC), a tablet PC, a set-top box (STB), a Personal Digital Assistant (PDA), a cellular telephone, a web appliance, a server, a network router, a switch or bridge, or any other computer capable of executing a set of instructions (sequential or otherwise) that specify actions to be taken by that computer. Further, while only a single computer is illustrated, the term "computer" shall also be taken to include any collection of computers that individually or jointly execute a set (or multiple sets) of instructions to perform any one or more of the methodologies discussed herein.

An exemplary computer 120 includes a processing device 202, a main memory 204 (e.g., read-only memory (ROM), flash memory, dynamic random access memory (DRAM) such as synchronous DRAM (SDRAM) or Rambus DRAM (RDRAM), etc.), a static memory 206 (e.g., flash memory, static random access memory (SRAM), etc.), and a data storage device 218, which communicate with each other via a bus 232.

The processing device 202 represents one or more general-purpose processing devices such as a microprocessor, a central processing unit, or the like. More particularly, the processing device 202 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device 202 may also be one or more special-purpose processing devices such as an application specific integrated circuit (ASIC), a field programmable gate array (FPGA), a digital signal processor (DSP), network processor, or the like. The processing device 202 may be configured to execute processing logic 226 for performing various operations and steps discussed herein.

The computer 120 may further include a network interface device 208. The computer 120 also may include a video display unit 210 (e.g., a liquid crystal display (LCD) or a cathode ray tube (CRT)), an alphanumeric input device 212 (e.g., a keyboard), a cursor control device 214 (e.g., a mouse), and a signal generation device 216 (e.g., a speaker).

The data storage device 218 may include a non-transitory computer-readable storage medium 230 (also known as a non-transitory computer-readable storage medium or a non-transitory computer-readable medium) on which is stored one or more sets of instructions (e.g., software 222) embodying any one or more of the methodologies or functions described herein. The software 222 may also reside, completely or at least partially, within main memory 204 and/or within processing device 202 during execution thereof by computer 120—main memory 204 and processing device 202 also constituting computer-accessible storage media. The software 222 may further be transmitted or received over a network 220 via network interface device 208.

While the computer-readable storage medium 230 is shown in an exemplary embodiment to be a single medium, the terms "computer-readable storage medium" and "machine-accessible storage medium" should be understood to include a single medium or multiple media (e.g., a centralized or distributed database, and/or associated caches and servers) that store the one or more sets of instructions. The term "computer-readable storage medium" should also be understood to include any medium that is capable of storing, encoding or carrying a set of instructions for execution by the computer and that cause the computer to perform any one or more of the methodologies of the present invention. The term "computer-readable storage medium" should accordingly be understood to include, but not be limited to, solid-state memories, optical and magnetic media, etc.

Exemplary Locker Bank

Figure 3:
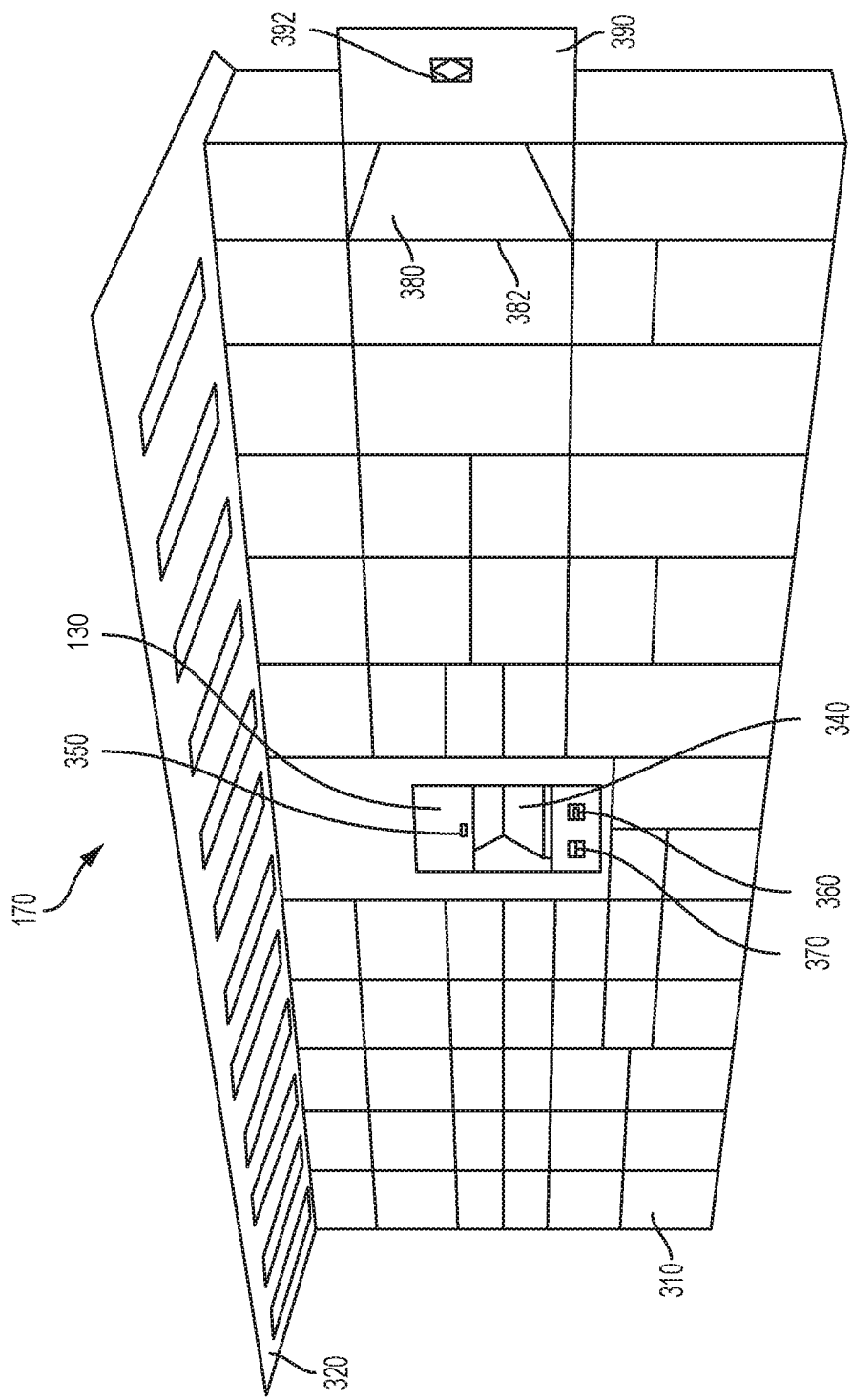
FIG. 3 is an exemplary computerized locker bank according to a particular embodiment.

FIG. 3 depicts an exemplary locker bank 170 that may be used in the context of a synchronized delivery system 110 for the temporary storage of one or more parcels until their retrieval (e.g., by a consignee or another on the consignee's behalf). In the embodiment shown in this figure, the locker bank 170 comprises a locker bank computer 130 that users (e.g., such as delivery drivers or parcel consignees) may use to facilitate the placement of one or more items into the locker bank 170 and/or retrieval of one or more items from the locker bank 170, for example, in any manner described in this disclosure or in any other suitable manner. The locker bank computer 130, in a particular embodiment, comprises a touch-screen display 340, one or more imaging devices 350 (e.g., one or more cameras), a card reader 360, and a machine-readable indicia scanner 370 (e.g., a barcode scanner). The locker bank 170 further comprises an optional awning 320 that extends outwardly from an upper portion of the locker bank 170 and may provide at least partial protection to users from various weather conditions such as rain, snow, wind, and sun when the users are placing parcels into the locker bank 170 and/or retrieving parcels from the locker bank 170.

As shown in this figure, a locker bank 170, according to a particular embodiment, further comprises a plurality of lockers 310 of varying sizes (e.g., small, medium, large, etc.). In a particular embodiment, the locker bank 170 comprises one or more secure lockers (e.g., one or more selectively securable locker compartments), made of a sufficiently strong material to prevent unwanted access to the lockers (e.g., a suitable metal such as steel). In various embodiments, the secure lockers 310 of the locker bank 170 comprise any suitable number, size, shape, dimension, etc. For example, a particular locker bank may include 25 secure lockers of varying sizes and shapes that are configured to hold a variety of different sized items. In various embodiments, the arrangement of the secure lockers 310 may include any suitable arrangement. For example, a particular locker bank may have all large lockers on the outer edges of the locker bank with smaller lockers towards the center of the locker bank.

In a particular embodiment, a locker bank comprises a plurality of secure lockers that each comprises an enclosure 380 (e.g., a substantially rectangular enclosure or any suitably shaped enclosure) defining at least one opening 382. In particular embodiments, each of the plurality of secure locker enclosures 380 define an enclosure having particular dimensions (e.g., a height, a width, and a depth). In various embodiments, the at least one opening 382 defined by the enclosure 380 defines a particular sized opening (e.g., having a height and width). In various embodiments, the one or more secure lockers 310 each comprise at least one door 390 adjacent the opening 382 for selectively restricting access to an interior portion of the one or more lockers 310 (e.g., an interior portion of the enclosure). In particular embodiments, the at least one door 390 is positioned to selectively prevent access to the interior of the locker enclosure 380 through the at least one opening 382 when the at least one door 390 is in a closed position. In various embodiments, the at least one door 390 is configured, when in an open position, to provide access to the interior of the locker enclosure 380 through the at least one opening 382 as shown.

In various embodiments, the one or more lockers 310 further comprise at least one locking mechanism 392 for maintaining the at least one door 390 in the closed position. In particular embodiments, the locking mechanism 392 includes an electronically-controlled locking mechanism. In particular embodiments, the locker bank computer 130 is configured to engage or disengage the locking mechanism 392 (e.g., lock and unlock the locker) in order to provide or restrict access to the locker enclosure 380.

Exemplary System Platform

Various embodiments of a system for delivering items (e.g. parcels) to computer-controlled alternate delivery locations (e.g., computerized locker banks) may be implemented within the context of any suitable service. For example, particular embodiments may be implemented within the context of any logistics service (e.g., such as those provided by United Parcel Service of America, Inc. of Atlanta, Ga.). Various aspects of the system's functionality may be executed by certain system modules, including a Direct-to-Locker-Bank Delivery Determination Module 400, a Synchronized Parcel Delivery to a Locker Bank Module 500, and a Parcel Pick Up Authorization Module 600. These modules are discussed in greater detail below.

It should be understood, in light of this disclosure, that the various functions described below in the context of the Direct-to-Locker-Bank Delivery Determination Module 400, the Synchronized Parcel Delivery to a Locker Bank Module 500, and the Parcel Pick Up Authorization Module 600 may be implemented in a manner other than the modular architecture described below. Various embodiments of these functions are described below in this manner to facilitate understanding of the invention described herein. Furthermore, while various embodiments described below may refer to various functions performed by the synchronized delivery system 110, it should be understood that such functions may be performed, in particular embodiments, by any suitable component of, or combination of components of the synchronized delivery system 110, such as those described above with respect to FIG. 1.

Additionally, although various steps and functions are described as occurring in response to another step, function, or triggering event, it should be understood that in various other embodiments, such functions or steps may occur in response to any other triggering functions or events; independent of any triggering functions or events; at least partially in response to any triggering functions or events; or in response to or at least partially in response to any combination of triggering functions, steps, events, etc. Although these exemplary modules are described as performing these functions in a particular order, it should be further understood that various other embodiments and implementations of these functions may occur in an order other than in which they are presented. Still other embodiments may omit particular steps or functions described below or perform additional steps or functions to those described.

Although for illustrative purposes, the system will be generally described in the context of parcel delivery to a computerized locker bank, it should be understood that other embodiments of the synchronized delivery system may be implemented in the context of any other suitable alternate delivery location system that may, for example, utilize attended or unattended alternate delivery locations as a temporary storage location for retrieval of parcels by consignees and others on their behalf. In various embodiments, these alternate delivery locations may include any suitable location other than a primary delivery address (e.g., home or office address) of a consignee. This may include, for example, any suitable location having one or more storage areas for holding items for later pickup. Particularly, these alternate delivery locations may include, for example, retail stores, gas stations, grocery stores, pharmacies, or any other suitable location.

A. Direct-to-Locker-Bank Delivery Determination Module

Figure 4:
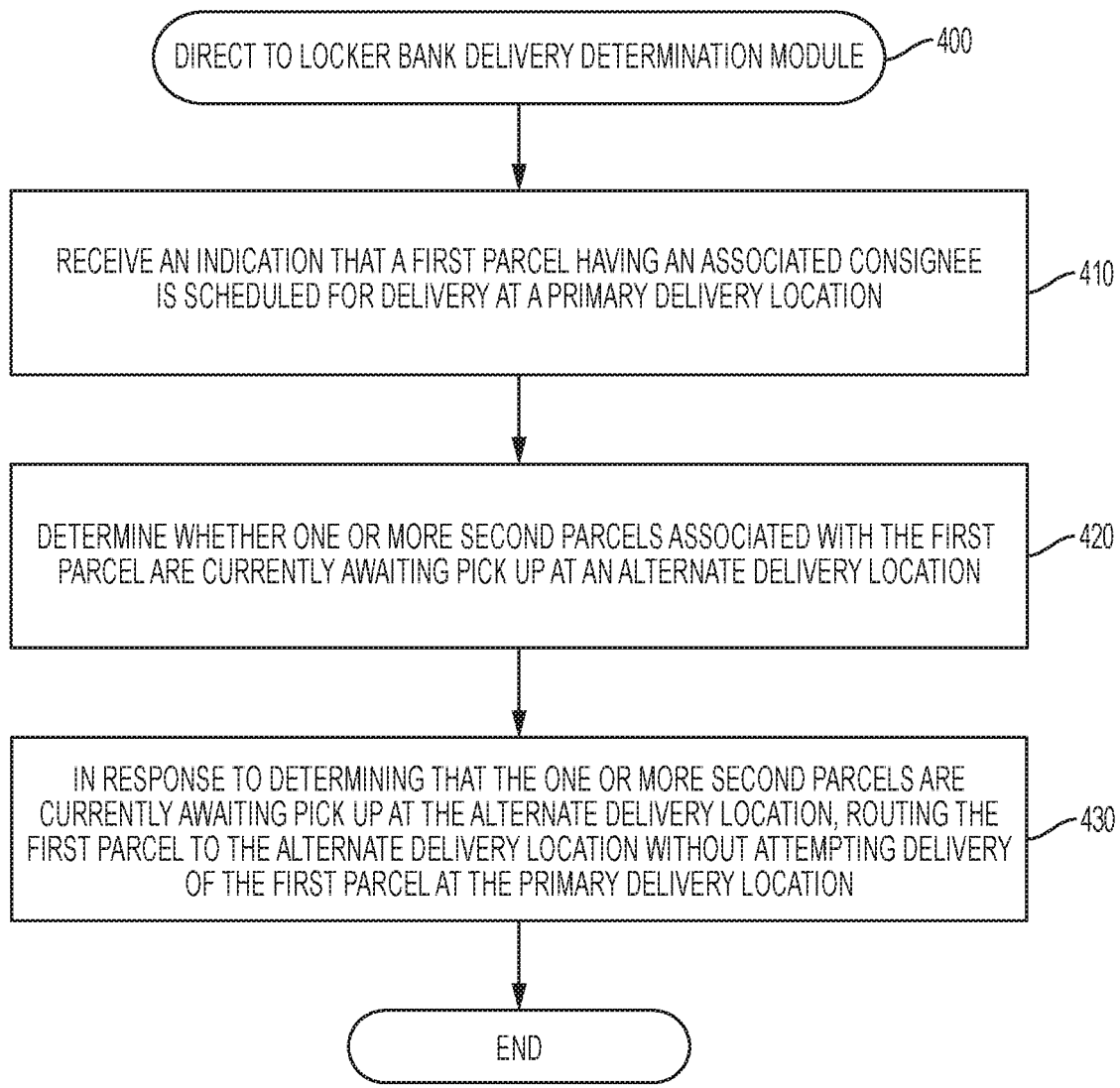
FIG. 4 depicts a flow chart that generally illustrates various steps executed by a Direct to Locker Bank Delivery Determination Module that, for example, may be executed by the logistics server of FIG. 1.

FIG. 4 is a flow chart of operations performed by an exemplary Direct-to-Locker-Bank Delivery Determination Module 400. In particular embodiments, a Direct-to-Locker-Bank Delivery Determination Module 400 may facilitate the routing of a first parcel directly to an alternate delivery location in lieu of attempting delivery of the first parcel at a primary delivery location. As discussed above, although the Direct-to-Locker-Bank Delivery Determination Module 400 below particularly describes parcel routing to a computerized locker bank, it should be understood in the context of this disclosure that the Direct-to-Locker-Bank Delivery Determination Module 400 may, in various other embodiments, be utilized in the context of the synchronized delivery system to route one or more parcels to any other suitable alternate delivery location or other location (e.g., a mobile package car, attended or unattended alternate delivery location, etc.).

In general, various embodiments of the Direct-to-Locker-Bank Delivery Determination Module 400 are configured to route one or more parcels directly from a distribution hub to a computerized locker bank, rather than attempting a potentially unsuccessful delivery at a primary delivery location in order to reduce a number of delivery attempts across a logistics network. As may be understood by one skilled in the art, eliminating even a single or a few delivery attempts over the course of a day for a particular delivery driver, when extrapolated over a period of time and plurality of other delivery drivers, may provide a reduction in consumption of fuel, a reduction in wear-and-tear on vehicles, an increased productivity of delivery drivers, and other benefits to logistics providers or others who may implement a synchronized delivery system 110 such as the various embodiments of a synchronized delivery system 110 described herein.

Various steps of an exemplary Direct-to-Locker-Bank Delivery Determination Module 400 are described below. Although these steps are discussed in a particular order, it should be understood that particular embodiments of a Direct-to-Locker-Bank Delivery Determination Module 400 may include one or more additional steps to those described, may omit one or more of the described steps, or may perform any of the steps in an order other than in which they are presented.

I. Receive an Indication that a First Parcel Having an Associated Consignee is Scheduled for Delivery at a Primary Delivery Location Referring to FIG. 4, when executing the Direct-to-Locker-Bank Delivery Determination Module 400 (e.g., executed by the one or more logistics servers 100), the synchronized delivery system 110 begins, at Step 410, by receiving an indication that a first parcel having an associated consignee is scheduled for delivery at a primary delivery location. The primary delivery location may, for example, include a delivery address to which the particular parcel is initially addressed (e.g., by a sender of the particular parcel) such as, for example: (1) a home address of the parcel's consignee; (2) a work address of the parcels' consignee; (3) a vacation address of the parcel's consignee; (4) an address of a friend or relative of the parcel's consignee; (5) a locker bank convenient to the parcel's consignee; or (6) any other suitable location. In such embodiments, the parcel may be addressed to be delivered to the consignee at the primary delivery location (e.g., the first parcel may be addressed to the consignee and indicate their home address on a shipping label printed or written on the first parcel).

In various embodiments, the system is configured to receive the indication when shipment of the first parcel is initiated (e.g., in response to initiation of shipment of the first parcel). In various embodiments, the system receives the indication at the one or more logistics servers 100 shown in FIG. 1. In particular embodiments, a common carrier may, for example, receive a first parcel for delivery (e.g., at a parcel drop-off location). The synchronized delivery system 110 may then receive consignee information associated with the first parcel, information associated with the first parcel itself, shipping information associated with the first parcel, or other suitable information (e.g., package level detail (PLD) information).

In various embodiments, the PLD information may comprise, for example consignee and/or shipper information associated with the first parcel such as: (1) a name of the consignee for the first parcel; (2) an address of the consignee for the first parcel; (3) an account number for a consignee account that the consignee has with the shipper of the first parcel; (4) a return address of the first parcel; (5) contact information associated with the consignee of the first parcel (e.g., telephone number, e-mail address, etc.); and/or any other suitable information associated with the first parcel's consignee or shipper. In further embodiments, the PLD information may comprise information associated with the first parcel such as, for example: (1) a description of one or more items shipped in the first parcel; (2) a number of the one or more items in the first parcel; (3) a weight of the first parcel; (4) a size of the first parcel (e.g., including dimensions such as length, width, and height); (5) a value of the one or more items in the first parcel; and/or (6) any other suitable information associated with the first parcel itself or the one or more items within. In still other embodiments, the PLD information may comprise shipping information associated with the first parcel such as, for example: (1) service level (e.g., overnight shipping, two-day shipping, ground shipping, etc.); (2) one or more special handling instructions (e.g., fragile, one or more temperature requirements, one or more special monitoring or tracking requirements, etc.); and/or (3) any other suitable shipping information associated with the first parcels.

In various embodiments, the synchronized delivery system 110 is configured to retrieve at least a portion of the PLD information using a unique tracking number associated with the first parcel, for example: (1) before intake of the first parcel; (2) concurrently with intake of the first parcel; or (3) after intake of the first parcel. The system may then use the PLD information to generate a shipping label for placement on the first parcel, where the shipping label includes the primary delivery address.

As an example, the system may be configured to receive the indication in response to a customer of a logistics provider dropping off the first parcel for shipment to the consignee (e.g., when the customer drops off the first parcel at a drop-off location associated with the logistics provider, the system may receive a generated unique identifier such as a 1Z number associated with the parcel). In other embodiments, the system may be configured to receive the indication from an online retailer, which may initiate the shipment in response to a purchase of one or more items from the online retailer by a customer of the online retailer.

In various other embodiments, the system (e.g., the one or more logistics servers 100) may receive the indication during any suitable phase of a delivery process for delivering the first parcel to the primary delivery location. In various embodiments, the indication may include a notification, message, status transmission, update to tracking information, or other suitable indication. In various embodiment, as may be understood by one skilled in the art, a parcel may be scanned at various points of the delivery process (e.g., at an intake location, at each distribution between the intake location and the delivery address, etc.). In particular embodiments, in response to a scan of the first parcel, the synchronized delivery system 110 may update tracking information associated with the first parcel (e.g., the PLD information) in the one or more databases 140 to include a time and location of the scan. In various embodiments, the system is configured to receive the indication that the first parcel is scheduled for delivery at the primary delivery location in response to a scan of the first parcel at a particular point in the delivery process.

For example, in particular embodiments, the system may receive the indication between a time at which the first parcel arrives at a local or regional distribution hub and a time at which the first parcel is loaded onto a delivery vehicle (e.g., package car) for delivery to the primary delivery location. In other embodiments, the system is configured to receive the indication after the first parcel has been loaded onto a delivery vehicle for delivery at the primary delivery location, but prior to a delivery attempt by a delivery driver of the first parcel at the primary delivery location. The system may, for example, receive the indication in response to a scanning (e.g., by one or more remote computing devices 150) of a unique identifier associated with the first parcel (e.g., which may be affixed to the first parcel). The unique identifier may be any unique identifier such as, for example, a linear barcode, a matrix barcode (e.g., QR code), an RFID tag, or any other suitable identifier.

In various embodiments, the system is configured to receive the indication on a day in which the first parcel is scheduled for delivery at the primary delivery location. In other embodiments, the system is configured to receive the indication immediately prior to facilitating loading of the first parcel on a delivery vehicle for ultimate delivery of the first parcel to the primary delivery location. In such embodiments, receiving the indication immediately prior to loading the first parcel on a delivery vehicle for delivery may enable the system to route the parcel directly to an alternate delivery location in lieu of attempting delivery at the primary delivery location without having to, for example, facilitate transfer of the first parcel to a different delivery vehicle.

II. Determine Whether One or More Second Parcels Associated with the First Parcel are Currently Awaiting Pick Up at an Alternate Delivery Location Continuing to Step 420, the system determines whether one or more second parcels associated with the first parcel are currently awaiting pick up at an alternate delivery location. In various embodiments, the system is configured to make the determination in response to receiving the indication that the first parcel is scheduled for delivery at the primary delivery location. In other embodiments, the system is configured to make the determination at a particular time prior to an expected delivery time of the first parcel at the primary delivery location. For example, the system may make the determination prior to loading the first parcel on a delivery vehicle, before a delivery vehicle carrying the first parcel leaves a distribution hub, or at any other suitable point in time (e.g., at a specific amount of time prior to an estimated delivery time of the first parcel at the primary delivery location). In still other embodiments, the system may make the determination in response to any other suitable triggering event or independent of any triggering event.

In particular embodiments, the one or more second parcels associated with the first parcel (e.g., the first parcel's consignee) may include one or more second parcels addressed to the consignee that the consignee has not yet picked up from the alternate delivery location. In such embodiments, the one or more second parcels that the consignee has not yet picked up may include, for example, one or more second parcels that were routed to the alternate delivery location following a previous unsuccessful delivery attempt of the one or more second parcels at the consignee's primary delivery location (e.g., home). For example, if a logistics provider attempted delivery of parcel A for a consignee at the consignee's primary delivery location on a Monday, and the consignee was not present to sign for the parcel, the logistics company may have routed the parcel to a computerized locker bank. If, on a subsequent day (e.g., the following day), the logistics company has parcel B scheduled for delivery at the consignee's primary delivery location, and the consignee has not yet picked up parcel A from the computerized locker bank, the system would determine that parcel A is associated with parcel B and currently awaiting pick up at an alternate delivery location. The system may, for example, determine that Parcel A is associated with Parcel B by comparing PLD information for parcel A and parcel B to determine whether parcels A and B have matching consignees, matching primary delivery addresses, matching consignee account numbers, or other matching PLD information or combination of matching PLD information.

In other embodiments, the one or more second parcels associated with the first parcel may include one or more second parcels that are associated with the first parcel by virtue of the one or more second parcels being associated with (e.g., addressed to) an individual to whom the consignee has given authorization to pick up parcels from alternate delivery locations on the consignee's behalf. In such embodiments, the one or more second parcels may be associated with an individual authorized to pick up the first parcel on the consignee's behalf. In various embodiments, the system may be configured to receive, from a particular consignee (e.g., a first consignee), authorization for particular other individuals (e.g., other consignees) to retrieve parcels from alternate delivery locations on their behalf. Various techniques for authorizing parcel pickup are described more fully below in the context of the Parcel Pickup Authorization Module 600.

In various embodiments, the system is configured to determine, for every parcel at the alternate delivery location, whether any parcel has an authorized individual (e.g., third party individual) that has been authorized by the first consignee to retrieve parcels on their behalf. The system may, for example, retrieve package level detail information for each parcel at the alternate delivery location (e.g., the system may retrieve the PLD information from the one or more databases 140). The system may further store a list of individuals that the first consignee has authorized to retrieve parcels on their behalf. The system may use the PLD information to determine a consignee for each of the parcels at the alternate delivery location, and compare the consignee for each parcel to the list of individuals authorized to retrieve parcels for the first consignee to determine whether there are one or more second parcels currently stored at the alternate delivery location that are associated with the first parcel (e.g., to determine whether one or more authorized third party individuals have one or more second parcels currently stored at the alternate delivery location).

In still other embodiments, the one or more second parcels associated with the first parcel may include one or more second parcels that are associated with the first parcel based on one or more business rules of a logistics provider that is currently handling the delivery of the first parcel. For example, in various embodiments, a logistics provider may have criteria for determining whether parcels are associated with one another for the purposes of routing directly to alternate delivery locations in lieu of making a delivery attempt at a primary delivery location. In particular embodiments, the system may be configured to enable a particular logistics provider to define the criteria (e.g., using pre-designed criteria, one or more drop down menus, one or more defined rules, etc.). In various embodiments, the system may store the defined criteria in memory. For example, a particular logistics provider may have one or more criteria that one or more second parcels are associated with the first parcel where: (1) the one or more second parcels have a second consignee that has the same primary delivery address as the consignee (e.g., because they are roommates, spouses, siblings, etc.); (2) the one or more parcels have an authorized third party that is a neighbor of the consignee (e.g., has a primary delivery address that is adjacent to or near the consignee); and/or (3) any other suitable criteria.

In various embodiments, the system is configured to determine whether the one or more second parcels are currently awaiting pick up by, for example: (1) retrieving package level detail information associated with the one or more second parcels (e.g., from the one or more databases 140); (2) determining tracking information for the one or more second parcels based on the package level detail information; and (3) using the tracking information to determine whether the one or more second parcels are currently stored at the alternate delivery location (e.g., locker bank)

and have not been retrieved by an associated consignee. In particular embodiments, the system is configured to retrieve the package level detail information from the one or more databases 140.

In various embodiments, the alternate delivery location may be any suitable delivery location. For example, in various embodiments, a logistics provider may assign a particular alternate delivery location to a particular delivery route. In other embodiments, the alternate delivery location may service a particular area or region. In particular embodiments, the alternate delivery location may include a preferred alternate delivery location for the consignee. In other embodiments, the alternate delivery location may be selected (e.g., automatically by the system) based on any other suitable factor. In particular embodiments, the system is configured to determine, for at least some of the parcels at a plurality of alternate delivery locations, whether they are associated with the first parcel and awaiting pickup. The plurality of alternate delivery locations may include, for example, any alternate delivery locations that service a particular area, any alternate delivery locations within a particular distance of the primary delivery location, etc.

III. In Response to Determining that the One or More Second Parcels are Currently Awaiting Pick Up at the Alternate Delivery Location, Routing the First Parcel to the Alternate Delivery Location without Attempting Delivery of the First Parcel at the Primary Delivery Location Next, at Step 430, the system continues by, in response to determining that the one or more second parcels are currently awaiting pick up at the alternate delivery location, routing the first parcel to the alternate delivery location without attempting delivery of the first parcel at the primary delivery location. In various embodiments, routing the first parcel to the alternate delivery location comprises modifying routing information for the first parcel and storing the modified routing information in memory (e.g., in the one or more databases 140 shown in FIG. 1).

In embodiments in which the first parcel has not yet been loaded on a delivery vehicle for delivery to the primary delivery location, the system may route the parcel directly to the alternate delivery location in any suitable manner. This may include, for example, facilitating loading, by the system, of the first parcel on any suitable delivery vehicle that has a delivery route that includes the alternate delivery location (e.g., the same alternate delivery location that is currently storing the one or more second parcels). Various systems and techniques for altering routing of parcel are described in U.S. Pat. No. 7,624,024, issued, Nov. 24, 2009, entitled, "Systems and Method for Dynamically Updating a Dispatch Plan", which is hereby incorporated by reference in its entirety.

In still other embodiments, such as embodiments in which the first parcel is already on the delivery vehicle for delivery to the primary delivery location when the system determines that one or more second parcels are currently awaiting pick up at the alternate delivery location, the system is configured to route the first parcel directly to the alternate delivery location, by modifying delivery route information for the delivery vehicle. As may be understood by one skilled in the art, a delivery driver for a logistics company may deliver parcels to generally the same area on a day-to-day basis, but the exact delivery route (e.g., including delivery stops, etc.) may vary from day-to-day based on where in the delivery driver's delivery area there are locations that the driver needs to deliver a parcel.

For each day, the system may generate a delivery route for the driver (e.g., including specific delivery stops) based on the plurality of parcels that are loaded on the delivery driver's vehicle for delivery. The system may modify this generated delivery route in response to determining that there are one or more second parcels awaiting pick up at the alternate delivery location, for example, by: (1) removing the primary delivery location from the delivery route; and (2) adding the alternate delivery location to the delivery route (e.g., or adding the first parcel to a manifest of parcels scheduled for delivery at the alternate delivery location where the alternate delivery location is already on the delivery route). In various embodiments, modification of the delivery route may occur while the delivery vehicle is in the middle of the delivery route.

In particular embodiments, the system may, in response to routing the first parcel to the alternate delivery location, transmit a notification to, for example: (1) the consignee; (2) an individual associated with the one or more second parcels (e.g., a consignee of the one or more second parcels or a third party authorized individual); and (3) a delivery driver. For example, the system may transmit the notification to one or more remote computing devices 150 associated with the individual. In embodiments in which the one or more second parcels are associated with an individual other than the first parcel's consignee, the system may be configured to transmit a message to the individual advising the individual to wait until a later time to retrieve the one or more second parcels (e.g., to ensure that the individual doesn't retrieve the one or more second parcels from the alternate delivery location prior to delivery of the first parcel at the alternate delivery location).

In various embodiments, the system is configured to transmit a second notification to the individual once the first parcel is delivered at the alternate deliver location (e.g., so the individual is aware that they are free to go retrieve their own parcel as well as the first parcel). In embodiments in which the system is configured to modify a delivery route of a delivery vehicle having a delivery driver during transport of the first parcel, the system may transmit a notification to the delivery driver's mobile computing device 180 in response to modifying the delivery route (e.g., to inform the driver not to stop at the primary delivery location).

In particular embodiments, the system is configured to update tracking information for the first parcel. In various embodiments, the updated tracking information may identify a triggering event that cause the system to route the first parcel directly to the alternate delivery location. For example, when the consignee checks tracking information for the first parcel, the tracking information may include a notification that "the first parcel was delivered to alternate delivery location A because your neighbor, Bob Smith, already has a parcel there for pick up." This may, for example, enable the consignee to coordinate with Bob Smith regarding who will pick up the parcels.

B. Synchronized Parcel Delivery to a Locker Bank Module

Figure 5:
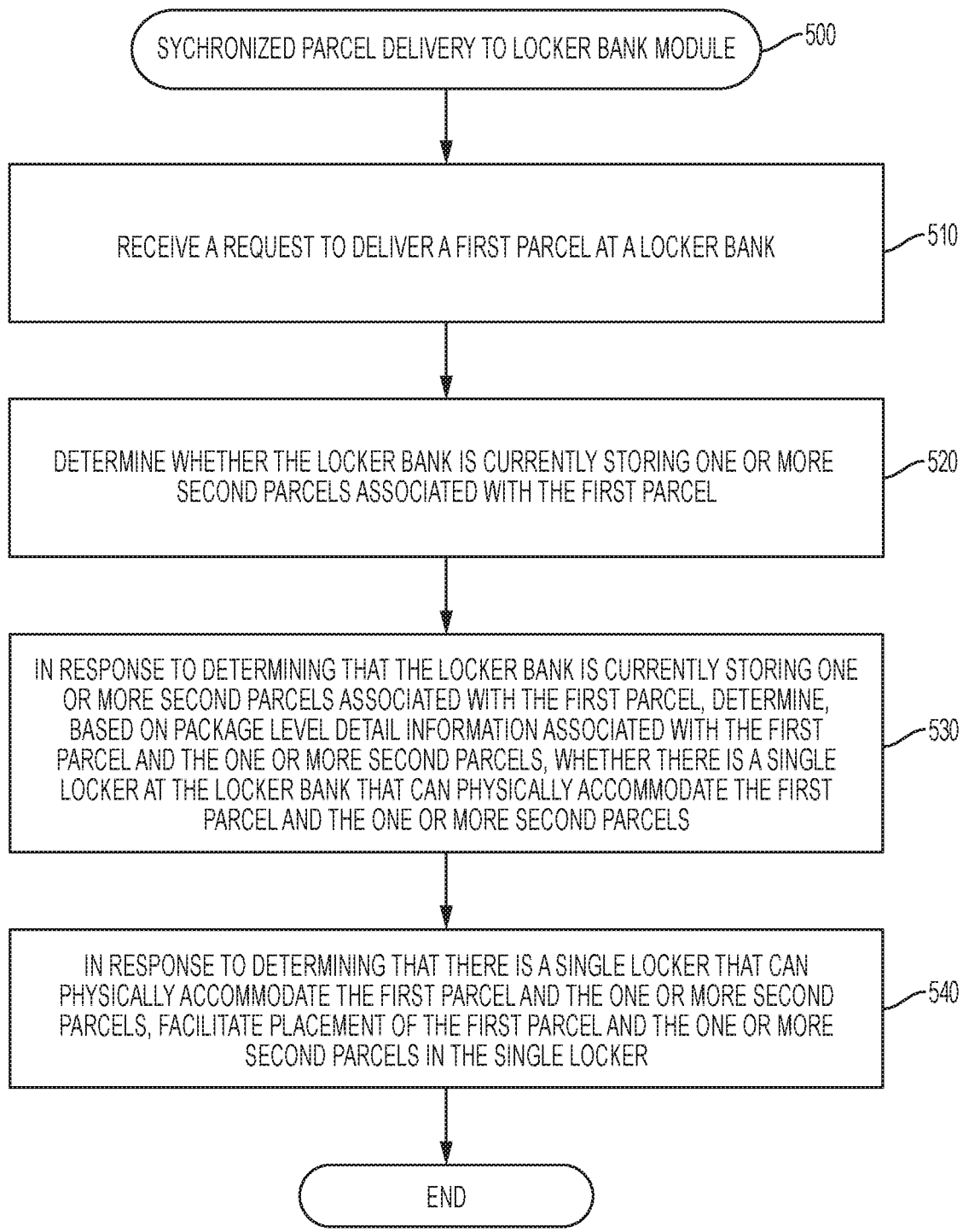
FIG. 5 depicts a flow chart that generally illustrates various steps executed by a Synchronized Parcel Delivery to Locker Bank Module that, for example, may be executed by the logistics server of FIG. 1.

FIG. 5 is a flow chart of operations performed by an exemplary Synchronized Parcel Delivery to a Locker Module Bank 500. In particular embodiments, a Synchronized Parcel Delivery to a Locker Module Bank 500 may facilitate the grouping of related parcels in a single locker at a locker bank, regardless of when each individual parcel was delivered to the locker bank. This may, for example, reduce a usage of lockers within the locker bank for related parcels and further reduce a chance that a particular locker bank will fill up and become unable to accept additional parcel deliveries.

I. Receive a Request to Deliver a First Parcel at a Locker Bank

When executing the Synchronized Parcel Delivery to a Locker Bank Module 500, the system begins at Step 510 by receiving a request to deliver a first parcel at a locker bank. In particular embodiments, the first parcel has an associated first consignee. In some embodiments, the system is configure to receive the request via the locker bank computer 130. In other embodiments, the system receives the request via the delivery driver's mobile computing device 180 (e.g., while the delivery driver's mobile computing device is in wireless communication with the locker bank computer 130).

In particular embodiments, the system may receive the request from a delivery driver, for example, in response to receiving, from the delivery driver, at least a portion of a tracking number (e.g., 1Z number) associated with the one or more parcels. The delivery driver may, for example, enter the at least a portion of the tracking number on a suitable alphanumeric entry device associated with the locker bank computer 130 (e.g., such as a keyboard, touchscreen, etc.). In various embodiments, the at least a portion of the tracking number may include any suitable portion of the tracking number. For example, the suitable portion of the tracking number may include: (1) the first or last three digits and/or letters of the tracking number; (2) the first or last four digits and/or letters of the tracking number; (3) the first or last five digits and/or letters of the tracking number; (4) the first or last six digits and/or letters of the tracking number; and/or (5) any suitable number of letters or digits that make up any suitable portion of the tracking number (e.g., first three and last three, etc.).

In other embodiments, the system is configured to receive the request to deliver the first parcel to the locker bank at least partially in response to receiving input of a machine-readable indicia (e.g., such as a linear barcode, QR code, RFID tag, electronic tag, or other suitable indicia), which may, for example, be printed on the first parcel and associated with tracking information for the first parcel. In various embodiments, the locker bank computer 130 may comprise one or more machine-readable indicia scanners (e.g., such as a barcode scanner, RFID reader), configured to enable the delivery driver (e.g., or another) to scan a machine-readable indicia on a particular parcel (e.g., affixed to the particular parcel, printed on the particular parcel, etc.). In particular embodiments, the system may retrieve information associated with the machine-readable information, such as, for example, tracking information for the particular parcel. The system may, for example, retrieve the information by locating a stored record (e.g., PLD record) for the parcel in the one or more databases 140 using a tracking number or other unique identifier associated with the parcel. In particular embodiments, the system is configured to interpret a scanning of a machine-readable indicia associated with a particular parcel as a request to deliver the first parcel to the locker bank.

II. Determine Whether the Locker Bank is Currently Storing One or More Second Parcels Associated with the First Parcel Continuing to Step 520, the system is configured to determine whether the locker bank is currently storing one or more second parcel associated with the first parcel. In various embodiments, the system is configured to determine whether the locker bank is currently storing one or more second parcel associated with the first parcel by, for example: (1) retrieving package level detail information associated with a plurality of parcels currently stored at the locker bank; and (2) using the package level detail information to determine which of the plurality of parcels are one or more second parcels that are associated with the first parcel. In particular embodiments, the system is configured to retrieve the package level detail information from the one or more database 140.

In various embodiments, the system may be configured to determine that one or more second parcels are associated with the first parcel based on, for example: (1) the one or more second parcels having a consignee that is the same as the first consignee; (2) the one or more second parcels has the same primary delivery address as the first parcel; (3) the one or more second parcels have a consignee that is identified as an authorized $3^{rd}$ party for the first consignee; etc. In various embodiments, the system may determine whether the one or more second parcels are associated with the first parcel in order to group the first parcel and the one or more second parcels into a single locker at the locker bank. In particular embodiments, the system may be configured to group the parcels into a single locker with an understanding that any particular consignee associated with any of the grouped parcels may retrieve all of the parcels grouped in the single locker at the same time (e.g., and distribute the parcels to their proper consignee themselves such as by dropping off a parcel at their neighbor's house).

III. In Response to Determining that the Locker Bank is Currently Storing One or More Second Parcels Associated with the First Parcel, Determining, Based on Package Level Detail Information Associated with the First Parcel and the One or More Second Parcels, Whether there is a Single Locker at the Locker Bank that can Physically Accommodate the First Parcel and the One or More Second Parcels Next, at Step 530, the system continues by, in response to determining that that the locker bank is currently storing one or more second parcels associated with the first parcel, determining, based on package level detail information associated with the first parcel and the one or more second parcels, whether there is a single locker at the locker bank that can physically accommodate the first parcel and the one or more second parcels. As discussed above, by seeking to group related parcels into a single locker, the system may reduce a number of lockers taken up by parcels which will be retrieved by the same individual (e.g., consignee) at a particular locker bank. Grouping the parcels in a single locker may further ease retrieve the parcels from the locker bank (e.g., by only requiring the individual to grab parcels from a single locker rather than two or more different lockers).

The system may determine whether there is a single locker at the locker bank that can physically accommodate the first parcel and the one or more second parcels by, for example: (1) retrieving (e.g., from the one or more databases 140) package level detail information for the first parcel and the one or more second parcels, the package level detail information comprising one or more dimensions (e.g., length, width, and height) of the first parcel and the one or more second parcels; (2) retrieving size information (e.g., such as volume) for one or more lockers at the locker bank (e.g., height, width, depth, etc.); and (3) determining based on the one or more dimensions of the first parcel and the one or more second parcels and the size information for the one or more lockers, whether a particular one of the one or more lockers can physically accommodate the first parcel and the one or more second parcels (e.g., can fit a first parcel having a first length, a first width, and a first height as well as one or more second parcels having a second length, a second width, and a second height).

The system may, for example, make the determination by comparing the one or more dimensions of the first parcels and the one or more second parcels with the size information for the one or more lockers. In various embodiments, the system compares a combined dimension, such as total width, length or height when the first parcel and the one or more second parcels are stacked on top of one another, placed adjacent one another, etc. with the size information for the one or more lockers to determine whether any particular one of the one or more lockers can physically accommodate the first parcel and the one or more second parcels. In particular embodiments, physically accommodating the first parcel and the one or more second parcels may include fitting the whole of the first parcel and the one or more second parcels within the particular locker's enclosure with the particular locker's door in a closed position. In still further embodiments, physically accommodating the first parcel and the one or more second parcels includes having capacity to accept the first parcel and the one or more second parcels (e.g., the single locker is not currently storing one or more other, unrelated parcels).

In particular embodiments, the system is configured to store (e.g., in the one or more database 140) size (e.g., cubic dimension) information for each particular locker within a locker bank. As may be understood in light of this disclosure, a particular locker bank may include one or more lockers of various sizes (e.g., small, medium, large). The system may store data related to dimensions (e.g., interior dimensions) of each particular locker size as well as a number of lockers having each particular locker size at a particular bank. In other embodiments, the system is further configured to track and store current capacity data associate with a particular locker bank (e.g., a number of currently occupied versus unoccupied lockers).

IV. In Response to Determining that there is a Single Locker that can Physically Accommodate the First Parcel and the One or More Second Parcels, Facilitate Placement of the First Parcel and the One or More Second Parcels in the Single Locker Continuing at Step 540, the system is configured to, in response to determining that there is a single locker that can physically accommodate the first parcel and the one or more second parcels, facilitate placement of the first parcel and the one or more second parcels in the single locker. The system may, for example, cause the single locker's door to open in order to facilitate placement of the first parcel and the one or more second parcels within the single locker (e.g., the one or more locker bank computers 130 may cause the single locker's locker mechanism 392 to disengage and activate an actuator or other device to at least partially open the single locker's door 390). The system may then direct the delivery driver to place the first parcel and the one or more second parcels in the single locker (e.g., the one or more logistics servers 100 may transmit a message to the delivery driver's mobile computing device 180 or the one or more locker bank computers 130 may display a message on its touch-screen display 340 instructing the delivery driver to place the first parcel and the one or more second parcels in the single locker).

As may be understood by one skilled in the art, in various embodiments, the one or more second parcels may already be stored within a particular locker when the delivery driver arrives to deliver the first parcel to the locker bank. In such embodiments, the system is configured to cause the single locker's door to open in addition to causing a door of a locker that is currently storing the one or more second parcels to open (e.g., to provide the delivery driver with access to the one or more second parcels for the purposes of grouping them with the first parcel in the single locker). The delivery driver may then retrieve the one or more second parcels from the locker in which they are currently stored, and place them in the single, larger locker along with the first parcel.

In particular embodiments, the system may determine that the first parcel will fit in the locker in which the one or more second parcels are currently stored. In such embodiments, the system may cause that locker to open in response to determining that it can accommodate the first parcel in addition to the one or more second parcels when the delivery driver is delivering the first parcel to the locker bank.

In still other embodiments, the system may determine that a locker that can accommodate the first parcel in addition to the one or more second parcels is one or more sizes larger than the locker that is currently storing the one or more second parcels. In such embodiments, the system may facilitate placement of the first parcel and one or more second parcels in a single locker by causing the locker currently storing the one or more second parcels (e.g., which may be a small sized locker) and one additional locker (e.g., such as a medium sized or large sized locker) to both open (e.g., by disengaging their respective locking mechanisms). The delivery driver may then remove the one or more second parcels from the small sized locker and place them, along with the first parcel in the additional locker. In particular embodiments, such as embodiments in which the system causes an additional locker to open along with the locker that is currently storing the one or more second parcels, the system is configured to determine the appropriately sized additional locker that is most proximate to the locker storing the one or more second parcels (e.g., to minimize a number of steps a delivery driver must take to transfer the one or more second parcels to a larger locker for storage along with the first parcel).

In embodiments in which the first parcel and the one or more second parcels will not fit within a single locker in the locker bank (e.g., because the parcels combine to be too large or there are too many parcels), the system may be configured to group the first parcel and the one or more second parcels in as few lockers as possible. For example, if there are five total parcels among the first parcel and the one or more second parcels, the system may be configured to group the five parcels into two lockers (e.g., a first locker and a second locker) with two parcels in the first locker and three parcels in the second locker. For example, the system may evaluate at least a portion of the possible parcel groupings using the total dimension technique described above (e.g., total dimensions for Parcel A+Parcel B placed adjacent and stacked; total dimensions for Parcel A+Parcel B+Parcel C placed adjacent and stacked; total dimensions for Parcel A+Parcel C placed adjacent and stacked).

In various embodiments, once the parcels have been grouped into a particular locker, the system is configured to associate each particular parcel with the particular locker in memory. The system may, for example: (1) update tracking information associated with each parcel; and (2) store the updated tracking information in memory.

In still other embodiments, the system is configured to facilitate placement of the first parcel and the one or more second parcels in a single locker without determining whether the single locker is sufficiently sized to accommodate all the parcels first. Once the parcels have been delivered to the single locker, the system may be configured to enable any consignee associated with any parcel in the locker to retrieve all of the parcels from the locker on behalf of the other consignees. In order to retrieve the parcels, any particular consignee may, for example, need to provide identifying information (e.g., name, e-mail address, phone number, etc.); provide identity confirmation (e.g., such as an identification card or credit card) or take any other suitable action to authorize release of the parcels (e.g., enter a private PIN, etc.). In various embodiments, the system is configured to authorize release of the parcels in any suitable manner.

C. Parcel Pickup Authorization Module

Figure 6:
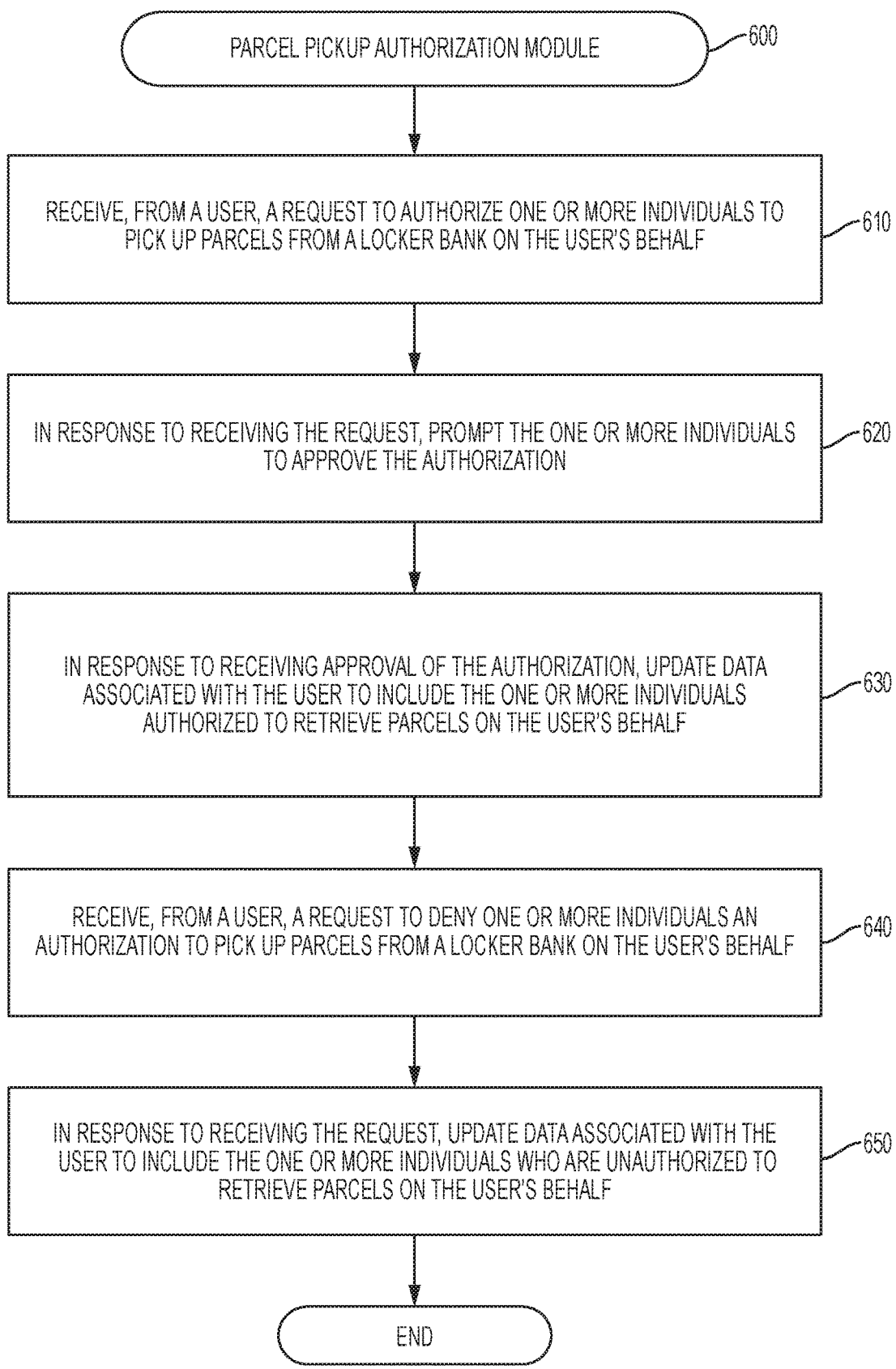
FIG. 6 depicts a flow chart that generally illustrates various steps executed by a Parcel Pickup Authorization Module that, for example, may be executed by the logistics server of FIG. 1.

FIG. 6 is a flow chart of operations that may be performed by an exemplary Parcel Pickup Authorization Module 600. In particular embodiments, a Parcel Pickup Authorization Module 600 (e.g., executed by the one or more logistics servers 100) is configured to enable a consignee or other individual to provide one or more authorized third parties that are authorized to retrieve parcels on the consignee's behalf. In particular embodiments, the system is further configured to enable the consignee to indicate one or more other individuals that the consignee would agree to potentially have pick up parcels for them from an alternate delivery location in lieu of having a logistics provider attempt a delivery of those parcels at the consignee's primary delivery address.

I. Receive, from a User, a Request to Authorize One or More Individuals to Pick Up Parcels from a Locker Bank on the User's Behalf When executing the Parcel Pickup Authorization Module 600, the system (e.g., the one or more logistics servers 100) begins at Step 610 by receiving from a user, a request to authorize one or more individuals to pick up parcels from a locker bank on the user's behalf. In particular embodiments, the system is configured to receive the request at the one or more logistics servers 100. In various embodiments, the system may receive the request at the one or more logistics servers 100 via a software application installed on a remote computing device 150. The synchronized delivery system may, for example, provide the software application for installation on the remote computing device 150, which may include, for example, the user's smart phone or other suitable remote computing device 150. The software application may include a user interface for providing access to a user account associated with a logistics provider (e.g., such as a UPS MyChoice Account). The system may enable the user to provide a name, address, and other identifying information (e.g., phone number, etc.) associated with the one or more individuals as part of the request.

In various embodiments the one or more individuals may include any suitable individual such as, for example, a neighbor, friend, relative, house-mate, spouse, co-worker, etc. In particular embodiments, the one or more individuals may include an office manager of an apartment building or similar building in which the user resides. In particular embodiments, the one or more individuals may include any other suitable individual.

II. In Response to Receiving the Request, Prompt the One or More Individuals to Approve the Authorization Continuing at Step 620, the system, in response to receiving the request, prompts the one or more individuals to approve the authorization. In various embodiments, the system may prompt the one or more individuals to approve the authorization by transmitting one or more messages to a remote computing device 150 associated with the one or more individuals (e.g., via text messages, e-mail, etc.). In various embodiments, the system may prompt the one or more users to provide the approval using a software application installed on the remote computing device 150. The synchronized delivery system may, for example, provide the software application for installation on the remote computing device 150, which may include, for example, the user's smart phone or remote computing device 150. The software application may include a user interface for providing access to a user account associated with a logistics provider (e.g., such as a UPS MyChoice Account).

The one or more individuals may provide the approval via the software application, by affirmatively responding to the one or more messages, or in any other suitable manner. As may be understood from this disclosure, it may be preferable in various embodiments for both a consignee to authorize an individual to retrieve parcels on their behalf and for the individual to agree to pick them up. In various embodiments, the authorization may be reciprocal (e.g., the consignee and individual both agree to pick up parcels on behalf of one another if need be).

In various embodiments, the request and/or authorization may include, for example: (1) a blanket approval of authorization for all parcels associated with the consignee, (2) a package specific approval, (3) a time specific approval (e.g., while the consignee is out of town), (4) a substantially real-time approval (e.g., in response to a determination by the system that a particular package is undeliverable).

III. In Response to Receiving the Approval of the Authorization, Update Data Associated with the User to Include the One or More Individuals Authorized to Retrieve Parcels on the User's Behalf Next, at Step 630, the system, in response to receiving the approval of the authorization, updates data associated with the user to include the one or more individuals authorized to retrieve parcels on the user's behalf. The system may, for example, update data associated with a user account associated with a logistics provider (e.g., such as a UPS MyChoice Account) for the user (e.g., by modifying the data and storing it in memory such as the one or more databases 140). In particular embodiments, the system updates and stores the data for later retrieval during execution of the Direct-to-Locker-Bank Delivery Determination Module 400 described above when determining whether one or more second parcels associated with a first parcel are awaiting pick up at a computerized locker bank (e.g., to determine whether the one or more second parcels are associated with the first parcel).

IV. Receive, from a User, a Request to Deny One or More Individuals an Authorization to Pick Up Parcels from a Locker Bank on the User's Behalf Continuing at Step 640, the system receives, from the user, a request to deny one or more individuals an authorization to pick up parcels from a locker bank on the user's behalf. In various embodiments, the system may receive the request in any suitable manner, such as any manner described above with respect to Step 610. In some embodiments, the user may wish to deny particular individuals from being able to retrieve parcels on the user's behalf. In various embodiments, for example, one or more business rules of a logistics provider may dictate that the logistics provider will route a first parcel having a consignee directly to an alternate delivery location where the consignee's roommate or neighbor already has to pick up their own parcel from the alternate delivery location. The consignee may, for any suitable reason (e.g., personal reasons, etc.) not desire for their neighbor or roommate (or other suitable person) to be able to pick up the first parcel (e.g., or any parcel). In such embodiments, the consignee could provide that information to the logistics provider using the system in order to override the logistics provider's business rules (e.g., during the systems determination process for routing parcels directly to locker banks).

V. In Response to Receiving the Request, Update Data Associated with the User to Include the One or More Individuals Who are not Authorized to Retrieve Parcels on the User's Behalf Continuing at Step 650, the system, in various embodiments, in response to receiving the request, updates data associated with the user to include the one or more individuals who are not authorized to retrieve parcels on the user's behalf. The system may update the data in any suitable manner, such as any manner discussed above with respect to updating the data for authorized individuals in Step 630.

Exemplary System Implementation

Figure 7:
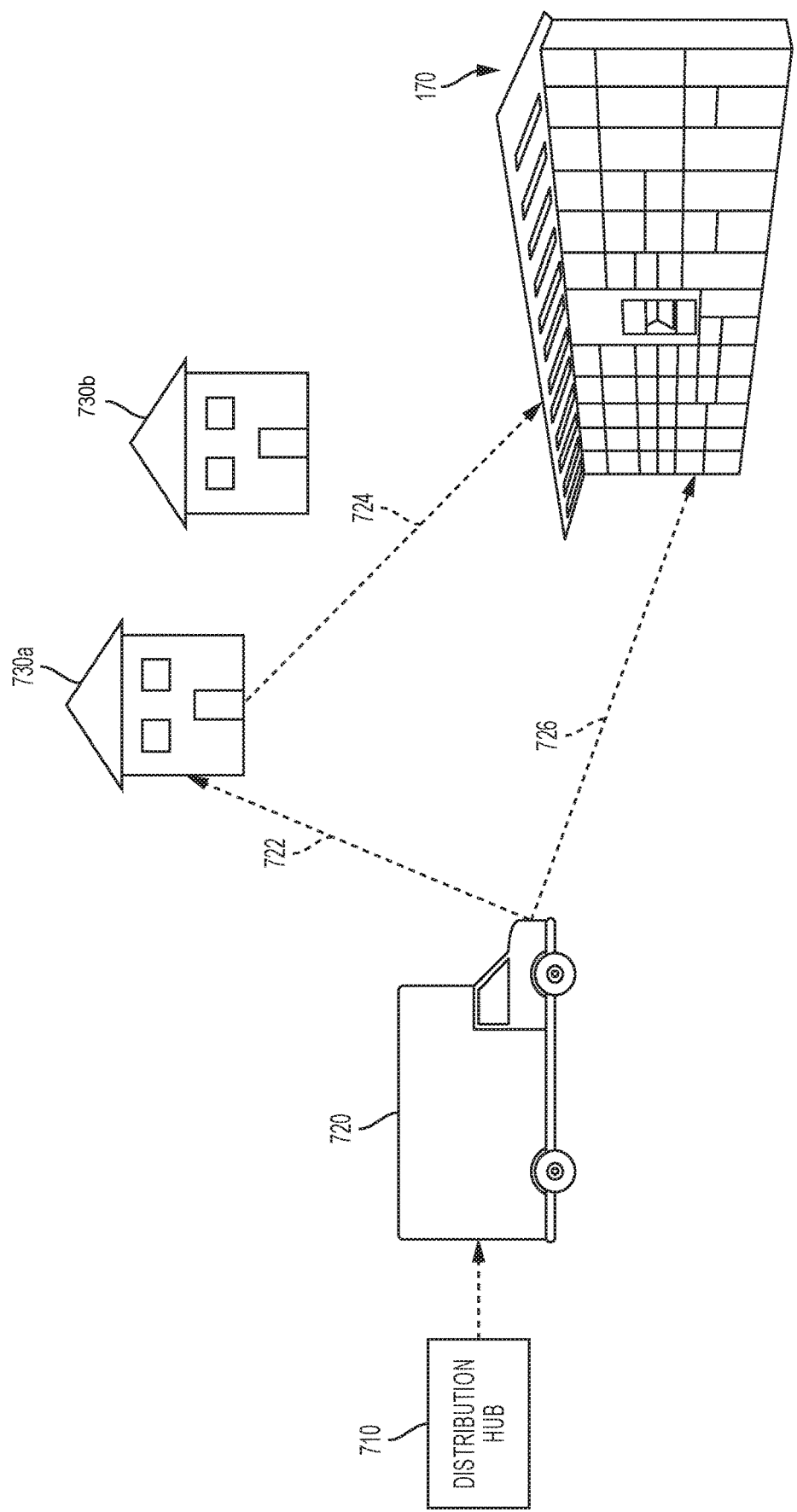
FIGS. 7-9 depict exemplary illustrative examples of an implementation of a synchronized delivery system according to various embodiments.
Figure 8:
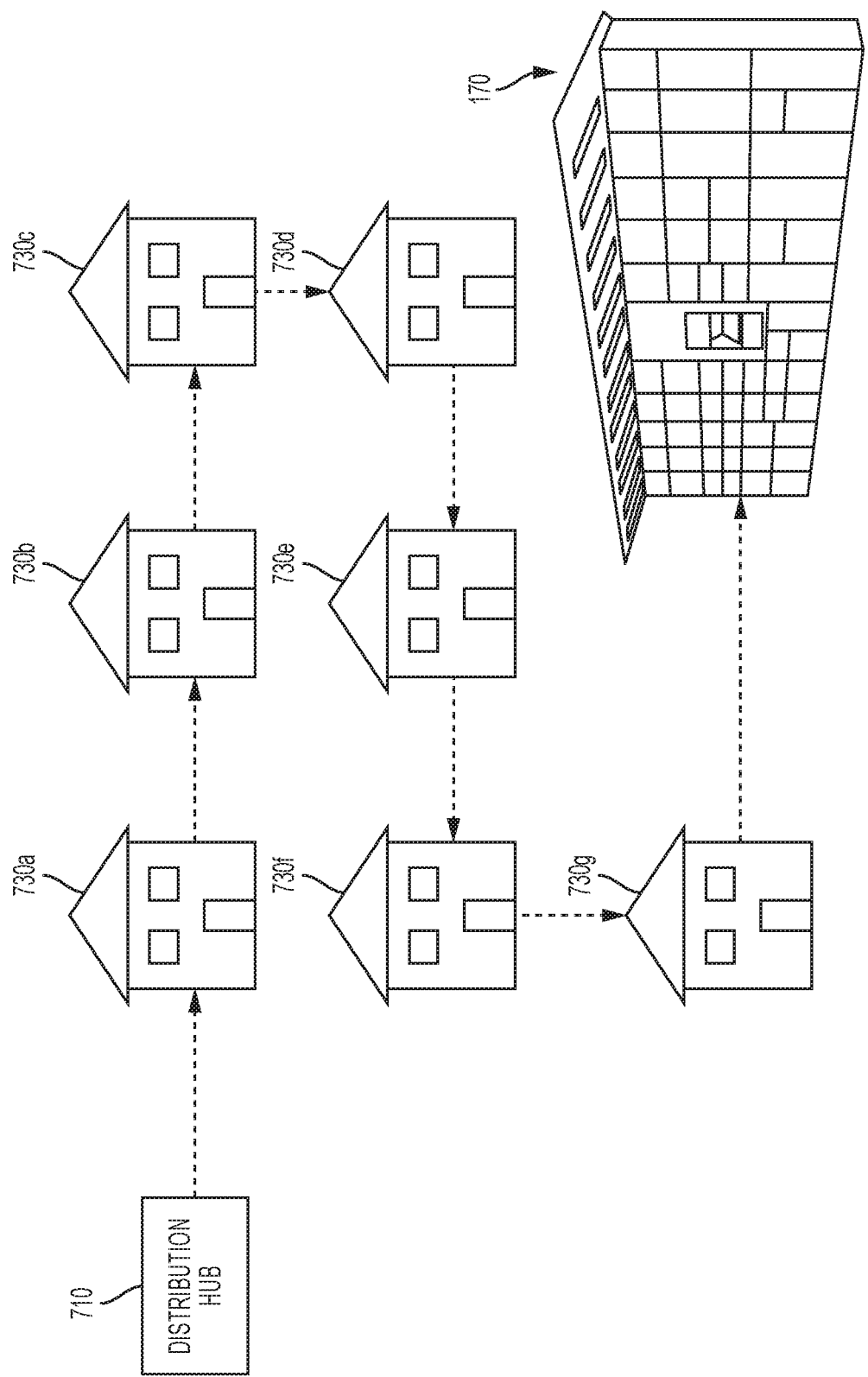
Figure 9:
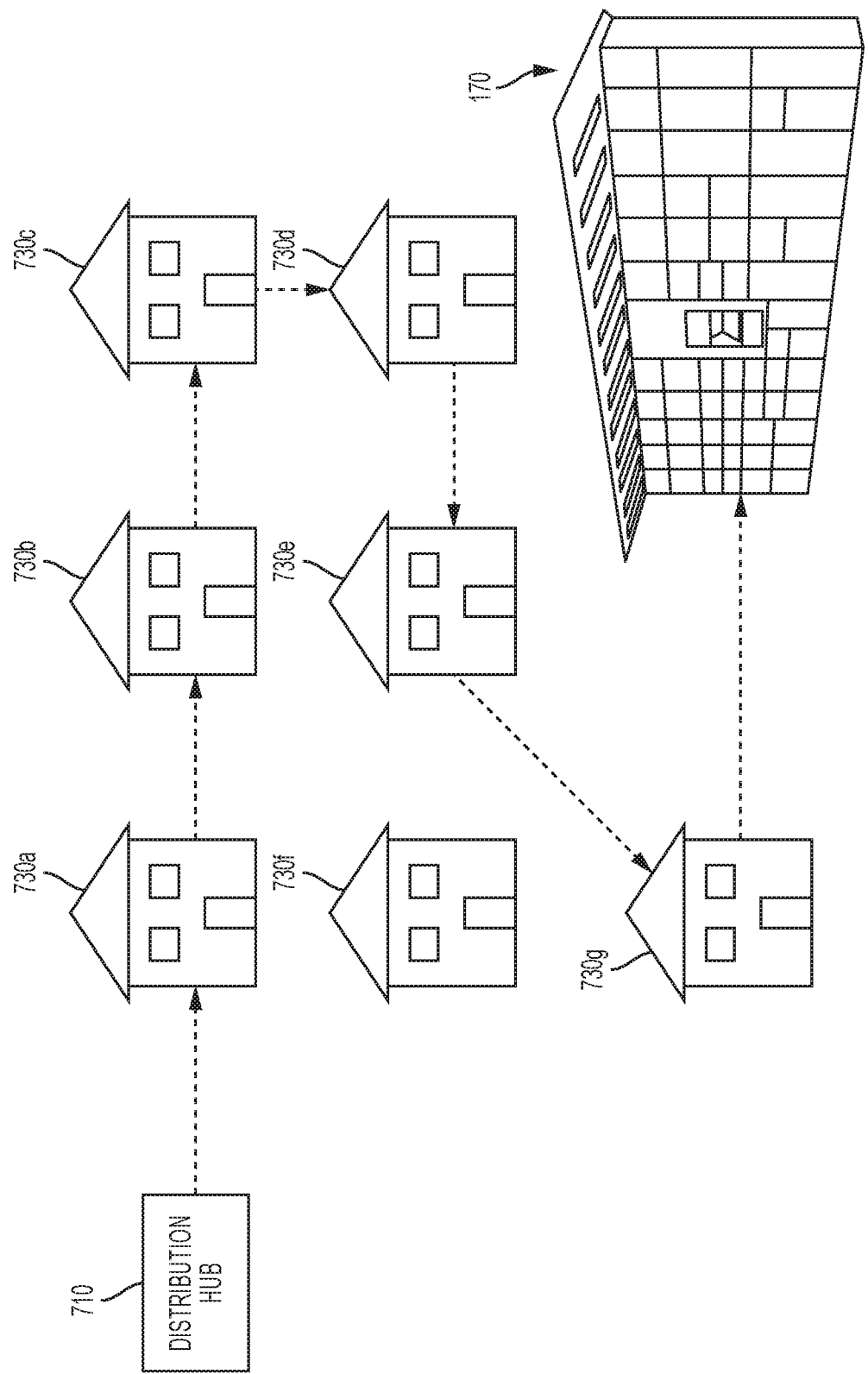

FIGS. 7-9 depict illustrative examples of the implementation of a synchronized delivery system according to various embodiments. As may be understood from FIG. 7, a logistics provider may facilitate delivery of a parcel from a distribution hub 710 using a delivery vehicle 720. In this example, if the delivery vehicle 720 is carrying a parcel scheduled for delivery at a primary delivery location (e.g., house 730*a*), the delivery vehicle 720 travels along delivery route 722 to the house 730*a*. Once at the house 730*a*, the delivery driver attempts to deliver the parcel to the house 730*a*. If the delivery driver is not able to deliver the parcel at the house 730*a*, the driver may, for example, scan the parcel using his mobile computing device 180 to indicate to the synchronized delivery system that delivery was unsuccessful. Upon receiving the indication, the system may route the parcel to a suitable locker bank 170 for the parcel's consignee to pick up at their convenience.

The system may then, when routing the parcel to the suitable locker bank 170, update a delivery route of the delivery vehicle 720 to include a stop at the suitable locker bank 720. The system may further update tracking information for the parcel to indicate that the parcel will be delivered to the locker bank 170 rather than the house 730*a*. The delivery driver may then travel in the delivery vehicle 720 along delivery route 724 to the locker bank 720 (e.g., which may include one or more additional stops prior to arriving at the locker bank 170), and deliver the parcel to the locker bank 170.

In another implementation of this example, as shown in FIG. 7, the delivery vehicle 720 may bypass the delivery attempt at the house 730*a* and deliver the parcel directly to the locker bank 720 via delivery route 726. As may be understood from this figure, the system may, at any suitable time prior to attempting delivery of the parcel at the house 730*a*, determine that the locker bank 170 is already storing one or more parcels related to the parcel that is out for delivery (or about to be placed on the delivery vehicle 720 for delivery). The system may, for example, determine that the consignee's neighbor in house 730*b* has a parcel that is currently stored in a locker at the locker bank 170 that was routed to the locker bank 170 following an unsuccessful delivery attempt on a previous day. Because the neighbor has not yet picked up their parcel from the locker bank 170, the system may determine to route the parcel, addressed to consignee in house 730*a*, directly to the locker bank 170. In various embodiments, the system is configured to make the determination to route the parcel directly to the locker bank 170 while the parcel is still at the distribution hub 710. Once the second parcel has been routed to the locker bank 170, either the consignee at house 730*a* or their neighbor in house 730*b* can travel to the locker bank 170, pick up both parcels, and deliver their neighbor's parcel to them.

As may be understood from FIG. 7, routing a parcel directly to a locker bank 170 may preclude the delivery vehicle 720 from having to travel along delivery route 722 during its daily deliveries (e.g., or reduce its overall delivery route by whatever distance or time is required to attempt delivery at house 730*a*).

FIG. 8 depicts an exemplary delivery diagram showing a delivery route that a delivery vehicle may take (e.g., during a particular day). As may be understood from this figure, the delivery route begins at a distribution hub 710, and includes stops at seven house 730*a*-*f* and a stop at a locker bank 170. Although in this example, the stop at the locker bank 170 is shown at the end of the route, it should be understood that a delivery route may include a stop at a locker bank 170 at any suitable portion of the route. Other delivery routes may include multiple stops at different locker banks throughout the route, or multiple stops at the same locker bank. In some embodiments, it may be preferable to make at least one final stop at a locker bank 170 during a delivery route in order to ensure that any unsuccessful delivery attempts during the route can be dropped off at the locker bank 170, if needed.

FIG. 9 depicts an exemplary delivery diagram showing a delivery route having seven houses 730*a*-*f* that skips a delivery attempt at a particular house 730*f*. In this example, the system may have determined to skip a delivery attempt at house 730*f* for any suitable reason. For example, the system may have determined that an unsuccessful delivery attempt was made to house 730*f* on a previous day, and there is currently an unretrieved parcel stored at the locker bank 170 stemming from that unsuccessful delivery attempt. The system may have determined that a person authorized to retrieve parcels from locker banks on a consignee having that house 730*f* as a primary delivery address has an unretrieved parcel from the locker bank 170. The consignee may, for example, have authorized any suitable individual to retrieve parcels on their behalf using a remote computing device 150 to login to an account associated with a logistics provider that is handling delivery of a parcel addressed to the consignee and provide the authorization. The authorized individual may include any suitable individual such as any suitable individual living in any house 730*a*-*f*, a family member, or any other individual.

In various embodiments, a delivery vehicle may have left the distribution hub 710 having a delivery route mapped out as shown in FIG. 8 at the beginning of the route. At some time during the route, the system may have determined that a parcel scheduled for delivery at house 730*f* had an associated parcel currently stored at the locker bank 170 that had not yet been picked up. The system may then have automatically modified the delivery route to remove house 730*f* as a stop and avoid a delivery attempt of the parcel at the house 730*f*—instead routing the parcel directly to the locker bank 170. In such an instance, the system may automatically transmit a notification to the delivery driver (e.g., to the driver's mobile computing device 180) indicating the change to the delivery route.

Exemplary Delivery Driver Experience

Figure 10:
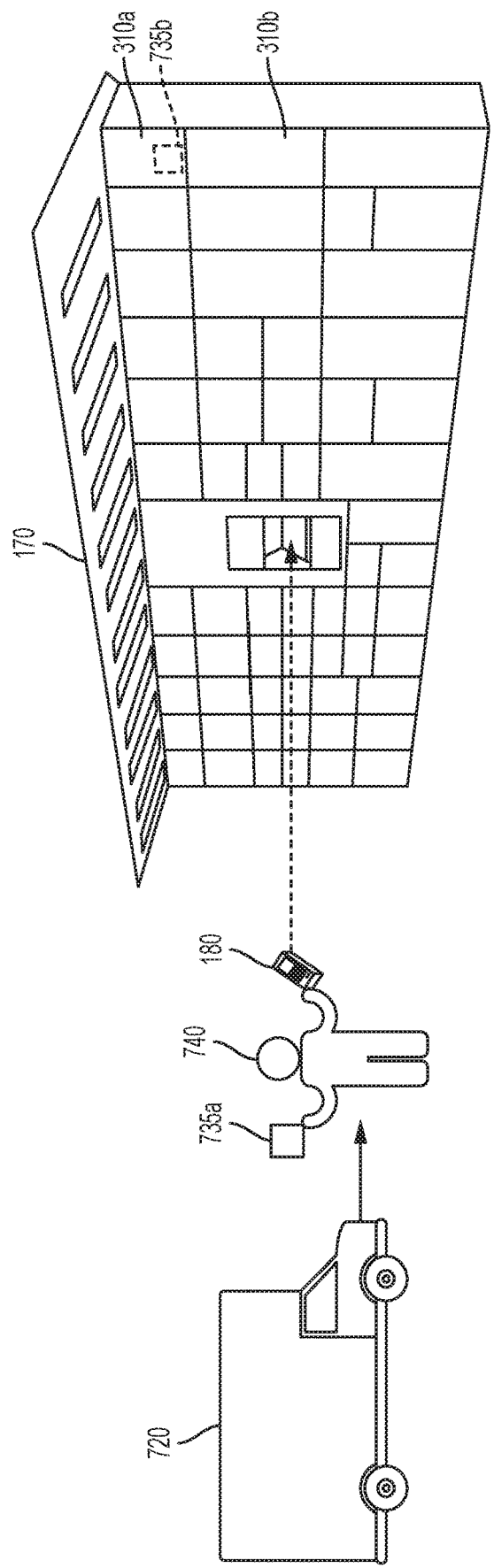
FIG. 10 depicts an exemplary user experience (e.g., delivery driver experience) according to various embodiments.

FIG. 10 depicts an exemplary delivery driver 740 experience when delivering a first parcel 735*a* to a locker bank 170 and grouping the first parcel 735*a* with second, related parcel 735*b* in a single locker 310*b*. As shown in this figure, when the delivery driver 740 arrives at the locker bank 170 in his or her delivery vehicle 720, the delivery driver 740 may utilize their mobile computing device 180 to request to deliver the first parcel 735*a* to the locker bank 170. The mobile computing device 180 may transmit the request directly to the locker bank computer 130 via a wireless communication channel (e.g., or indirectly via one or more networks 115 as shown in FIG. 1). The system may then receive the request (e.g., at one or more logistics servers 100) and, in response, determine whether there are any parcels associated with (e.g., related to) the first parcel 735*a* currently stored at the locker bank 170 (e.g., in a locker at the locker bank).

The system may, for example, determine that a second parcel 735*b* stored in medium-sized locker 310*a* is associated with the first parcel 735. The first parcel 735*a* and the second parcel 735*b* may be related, for example, in that the parcels (1) have the same delivery address, (2) have the same consignee; (3) have respective consignees that are authorized to retrieve parcels on each other's behalf; (4) have respective consignees that are neighbors, roommates, co-workers, etc.; or (5) are related for any other suitable reason. The system, in response to determining that the first parcel 735*a* and the second parcel 735*b* are related may then determine whether there is a single locker at the locker bank that can physically accommodate (e.g., fit) both the first parcel 735*a* and the second parcel 735*b*). In this example, the system may determine that, based on the dimensions of first parcel 735*a* and the second parcel 735*b*, the first parcel 735*a* and the second parcel 735*b* would both fit in a single, large-sized locker.

In response to determining that the first parcel 735*a* and the second parcel 735*b* would both fit in a single, large-sized locker, the system in this example may facilitate delivery of the first parcel 735*a* and the second parcel 735*b* in a single, large-sized locker by: (1) causing a door of the medium-sized locker 310*a* and a door of a large-sized locker 310*b* to open (e.g., automatically by causing a locking mechanism of each door to disengage and causing an actuator or similar device to cause both doors to at least partially open); (2) instructing the delivery driver (e.g., by displaying one or more instructions on the touch-screen display 370 of the locker bank computer 130 or on a display screen of the mobile computing device 180) to remove the second parcel 735*b* from the medium-sized locker 310*a* and place both the first parcel 735*a* and the second parcel 735*b* in the large-sized locker 310*b*.

The driver may then close the large-sized locker 310*b*, which may cause the system to associate both the first parcel 735*a* and the second parcel 735*b* with the large-sized locker 310*b* in memory (e.g., by updating tracking information or other package level detail information associated with the parcels). The system may then automatically activate the locking mechanism of the large-sized locker 310*b* to maintain the door in a closed position and locked state. The system may further update tracking information associated with the first parcel 735*a* and the second parcel 735*b* to reflect the locker bank 170 at which they are located and the large-sized locker 310*b* in which they both are stored. The system may further transmit a notification to the consignee of the first parcel 735*a* and/or the second parcel 735*b* indicating that the two parcels are housed at the locker bank for retrieval.

ALTERNATIVE EMBODIMENTS

Various embodiments of a synchronized delivery system may include features or perform functions in addition to those described above. Various exemplary alternative embodiments of a synchronized delivery system are described below.

On-the-Fly Delivery Route Modification Based on Unsuccessful Deliveries During Route In various embodiments, the system is configured to modify a delivery route of a particular delivery vehicle in response to re-routing any unsuccessful delivery on the delivery route to an alternate delivery location. In particular embodiments, the system may modify the delivery route periodically (e.g., in response to each re-routing); asynchronously, in response to a status change of any parcel currently out for delivery on the delivery vehicle; in response to a change in user-submitted third party authorization pick up preferences, etc. For example, as a delivery driver progresses through their route, the system may receive one or more indications that one or more parcels were not successfully delivered (e.g., because the consignee was not home, etc.). In response to the system rerouting such parcels to an alternate delivery location, the system may, for each remaining parcel scheduled for delivery during the delivery route, determine whether each parcel is associated with any rerouted parcel. The system may then automatically route any associated parcels to the alternate delivery location as well, without making a delivery attempt at those parcels' primary delivery location. For example, an unsuccessful delivery attempt of a first parcel at a first house may result in routing of the first parcel to an alternate delivery location. If there is a scheduled delivery on the delivery route of a second parcel at a second house that is a neighbor of the first house, the system may automatically route the second parcel to the alternate delivery location as well, without attempting the delivery at the second house.

Skipping Parcel Grouping at Locker Bank Based on Capacity

In various embodiments, the system is configured to determine an availability at a locker bank prior to grouping parcels within a single locker in the locker bank. For example, if the locker bank is mostly empty (e.g., there are at least a particular number of available lockers at the locker bank), the system may determine that it is unnecessary to group related parcels together to conserve capacity. The system may, for example, utilize any suitable technique for predicting future capacity at the locker bank to determine whether it is necessary to attempt to group related parcels at a time of delivery.

Asynchronous Pickups by Consignees and Others

In particular embodiments, a consignee (e.g., or another on their behalf) may not pick up all parcels at once when retrieving parcels from a locker bank. For example, where two or more parcels have been delivered to a single locker, the consignee may retrieve fewer than all of the parcels for any reason (e.g., because carrying the parcels all at once is too difficult, one of the parcels is too heavy, or for any other suitable reason). In such embodiments, the system may, for example, store a notation that the parcel that was left behind should not be grouped with other parcels in a single locker again (e.g., in case there is a subsequent delivery at a later time such as later that day or in the next few days before the consignee returns to pick up the final parcel that was left). The system may, for example, determine that a parcel was left behind using one or more weight sensors in the locker, using a suitable light curtain in the locker, using one or more cameras associated with (e.g., positioned within) the locker, or using any other suitable technique.

In particular embodiments, the system may determine for particular consignees that it should never facilitate a grouping of a plurality of parcels in a single locker because, for example, that consignee frequently leaves at least one parcel behind when retrieving grouped parcels. In other embodiments, the system may modify tracking data for the left-behind parcel to reattempt delivery at the primary delivery location for that parcel. The system may, for example: (1) instruct a delivery driver to retrieve the parcel from the locker; and (2) facilitate delivery to the primary delivery location. This course of action may, for example, be helpful for consignees who have trouble retrieving multiple parcels from a locker bank at once (e.g., due to a handicap or other factors such as having to walk the parcels back to their home such as in an urban environment).

CONCLUSION

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for the purposes of limitation.

What is claimed is:

1. A direct-to-locker bank delivery system comprising:
a computerized locker bank comprising:
a plurality of selectively securable locker compartments, each of the plurality of selectively securable locker compartments comprising one or more doors and one or more locking mechanisms; and
one or more locker bank computers comprising one or more processors and memory; and
one or more remote logistics servers comprising one or more processors and memory, wherein:
the memory stores:
first package level detail information for a first parcel, the first package level detail information comprising data associated with a first consignee, including a delivery address and first consignee identification information;
package level detail information for one or more parcels currently stored at the computerized locker bank, wherein the package level detail information comprises, for each respective parcel of the plurality of parcels, consignee information for the respective parcel; and the one or more processors are configured to:
receive an indication that the first parcel is scheduled for delivery to the delivery address;
determine whether the one or more parcels currently stored at the computerized locker bank comprise one or more second parcels associated with the first parcel based on the package level detail information for the one or more parcels currently stored at the computerized locker bank and the first package level detail information;
in response to determining that the one or more parcels currently stored at the computerized locker bank comprise the one or more second parcels, route the first parcel to the computerized locker bank without attempting delivery of the first parcel at the primary delivery location;
receive a request to store the first parcel in the computerized locker bank; and
in response to receiving the request, operate the one or more locking mechanisms on a particular one of the plurality of selectively securable locker compartments to open the one or more doors.

2. The direct-to-locker bank delivery system of claim 1, wherein:
the first package level detail information further comprises one or more dimensions of the first parcel;
the one or more pieces of package level detail information for the one or more parcels currently stored at the computerized locker bank further comprise, for each respective parcel of the plurality of parcels, one or more dimensions of the respective parcel; and
the one or more processors are further configured to:
determine, based on the one or more dimensions of the first parcel and one or more dimensions of the one or more second parcels, whether a particular one of the plurality of selectively securable locker compartments is sufficiently large to accommodate both the first parcel and the one or more second parcels; and
in response to determining that the particular one of the plurality of selectively securable locker compartments is sufficiently large to accommodate both the first parcel and the one or more second parcels, facilitate placement of the first parcel and the one or more second parcels in the particular one of the plurality of selectively securable locker compartments.

3. The direct-to-locker bank delivery system of claim 1, wherein:
routing the first parcel to the computerized locker bank without attempting delivery of the first parcel at the primary delivery location comprises modifying a delivery route of a delivery vehicle scheduled to deliver the first parcel to the primary delivery location.

4. The direct-to-locker bank delivery system of claim 1, wherein:
routing the first parcel to the computerized locker bank without attempting delivery of the first parcel at the primary delivery location comprises modifying tracking information associated with the first parcel to include an updated destination of the computerized locker bank; and
the one or more processors are further configured to store the modified tracking information in memory.

5. The direct-to-locker bank delivery system of claim 1, wherein:
the one or more processors are further configured to determine whether the one or more parcels currently stored at the computerized locker bank comprise the one or more second parcels based on one or more business rules associated with a logistics provider that is facilitating delivery of the first parcel;
the one or more business rules comprise a business rule to route the first parcel directly to the computerized locker bank without attempting delivery of the first parcel at the primary delivery location in response to determining that the one or more parcels currently stored at the computerized locker bank comprise a parcel having a consignee that is a neighbor of the first consignee.

6. The direct-to-locker bank delivery system of claim 1, wherein:
the one or more processors are further configured to determine whether the one or more parcels currently stored at the computerized locker bank comprise the one or more second parcels based on whether the one or more parcels currently stored at the computerized locker bank comprise a parcel having a consignee that is authorized to retrieve parcels from the computerized locker bank on behalf of the first consignee.

7. The direct-to-locker bank delivery system of claim 6, wherein:

the one or more processors are further configured to:
receive, from the consignee, a request to authorize one or more individuals to pick up parcels from the computerized locker bank on behalf of the consignee;
in response to receiving the request, update data associated with the consignee to include the one or more individuals authorized to retrieve the parcels on behalf of the consignee; and
store the updated data in memory.

8. The direct-to-locker bank delivery system of claim 7, wherein the one or more processors are further configured to enable the consignee to provide a selection of one or more unauthorized individuals that are not authorized to pick up parcels from the computerized locker bank on behalf of the consignee.

9. The direct-to-locker bank delivery system of claim 1, wherein:
the one or more processors are further configured to determine whether the one or more parcels currently stored at the computerized locker bank comprise the one or more second parcels based on whether the one or more parcels currently stored at the computerized locker bank comprise a parcel having a second consignee; and
the second consignee is the first consignee.

10. The direct-to-locker bank delivery system of claim 1, wherein:
the direct-to-locker bank delivery system further comprises a network of a plurality of computerized locker banks; and
the computerized locker bank is a particular computerized locker bank in the network of the plurality of computerized locker banks.

11. A computer-implemented method of facilitating delivery of a first parcel to a locker bank,
the method comprising:
receiving, by one or more processors, at a logistics server, a request to deliver the first parcel to a first location;
at least partially in response to receiving the request, determining, by one or more processors, for at least one second location, whether one or more second parcels currently stored at the at least one second location are associated with the first parcel, wherein the at least one second location comprises:
the locker bank comprising:
a plurality of selectively securable locker compartments, each of the plurality of selectively securable locker compartments comprising one or more doors and one or more locking mechanisms; and
one or more locker bank computers comprising one or more processors and memory;
in response to determining that the one or more second parcels are associated with the first parcel, routing, by one or more processors, the first parcel to the second location;
receiving, by one or more processors, a request to deliver the first parcel to the computerized locker bank at the second location; and
in response to receiving the request, operating, by one or more processors, the one or more locking mechanisms on a particular one of the plurality of selectively securable locker compartments to open the one or more doors.

12. The computer-implemented method of claim 11, wherein:
the first location is the at least one second location;
the first parcel has a first consignee; and
determining whether one or more second parcels currently stored at the at least one second location are associated with the first parcel comprises determining whether the one or more second parcels have a second consignee selected from a group consisting of:
i. a neighbor of the first consignee;
ii. an individual that shares a primary delivery address with the first consignee; and
iii. the first consignee.

13. The computer-implemented method of claim 12, further comprising:
retrieving, by one or more processors, first package level detail information for the first parcel, the first package level detail information comprising one or more first dimensions;
retrieving, by one or more processors, second package level detail information for the one or more second parcels associated with the first parcel, the second package detail level information comprising one or more second dimensions;
determining, by one or more processors, based on the one or more first dimensions and the one or more second dimensions, whether a particular one of the plurality of selectively securable locker compartments is sufficiently large to accommodate both the first parcel and the one or more second parcels associated with the first parcel; and
in response to determining that the particular one of the plurality of selectively securable locker compartments is sufficiently large to accommodate both the first parcel and the one or more second parcels associated with the first parcel, facilitating placement, by one or more processors, of the first parcel and the one or more second parcels associated with the first parcel in the particular one of the plurality of selectively securable locker compartments.

14. The computer-implemented method of claim 13, wherein:
the one or more second parcels associated with the first parcel are currently stored in a second particular one of the plurality of selectively securable locker compartments; and
facilitating placement of the first parcel and the one or more second parcels associated with the first parcel in the particular one of the plurality of selectively securable locker compartments comprises:
operating, by one or more processors, the one or more locking mechanisms on the particular one of the plurality of selectively securable locker compartments to open the one or more doors;
operating, by one or more processors, the one or more locking mechanisms on the second particular one of the plurality of selectively securable locker compartments to open the one or more doors;
facilitating a transfer, by one or more processors, of the one or more second parcels associated with the first parcel from the second particular one of the plurality of selectively securable locker compartments to the particular one of the plurality of selectively securable locker compartments; and
facilitating placement, by one or more processors, of the first parcel in the particular one of the plurality of selectively securable locker compartments with the one or more second parcels associated with the first parcel.

15. The computer-implemented method of claim 13, wherein:

the one or more second parcels associated with the first parcel are currently stored in the particular one of the plurality of selectively securable locker compartments; and facilitating placement of the first parcel and the one or more second parcels associated with the first parcel in the particular one of the plurality of selectively securable locker compartments comprises:

operating, by one or more processors, the one or more locking mechanisms on the particular one of the plurality of selectively securable locker compartments to open the one or more doors; and facilitating placement, by one or more processors, of the first parcel in the particular one of the plurality of selectively securable locker compartments with the one or more second parcels associated with the first parcel.

16. The computer-implemented method of claim 11, wherein:

the first location is a primary delivery location of the first parcel;

the first parcel has a first consignee; and determining whether one or more second parcels currently stored at the at least one second location are associated with the first parcel comprises determining whether the one or more second parcels have a second consignee selected from a group consisting of:

i. a neighbor of the first consignee;

ii. an individual that shares the primary delivery address with the first consignee; and iii. the first consignee.

17. The computer-implemented method of claim 16, wherein:

the method comprises determining whether one or more second parcels currently stored at the at least one second location are associated with the first parcel at a time while the first parcel is loaded on a delivery vehicle and en route to the primary delivery location, but prior to a delivery attempt of the first parcel at the primary delivery location.

18. The computer-implemented method of claim 16, wherein:

the method comprises determining whether one or more second parcels currently stored at the at least one second location are associated with the first parcel at a time prior to the first parcel being placed on a delivery vehicle for delivery to the primary delivery location.

19. The computer-implemented method of claim 16, wherein routing the first parcel to the second location comprises routing the first parcel to the second location prior to a delivery attempt of the first parcel at the primary delivery location.

20. A locker delivery system comprising:

a computerized locker bank comprising:

a plurality of selectively securable locker compartments, each of the plurality of selectively securable locker compartments comprising one or more doors and one or more locking mechanisms; and one or more locker bank computers comprising one or more processors and memory; and one or more remote logistics servers comprising one or more processors and memory, wherein:

the memory stores:

first package level detail information for a first parcel, the first package level detail information comprising data associated with a first consignee and one or more first dimensions of the first parcel;

one or more pieces of package level detail information for one or more parcels currently stored at the computerized locker bank, wherein the one or more pieces of package level detail information comprise, for each respective parcel of the plurality of parcels, consignee information for each respective parcel and one or more second dimensions of each respective parcel; and the one or more processors are configured to:

receive an indication that the first parcel is scheduled for delivery at a primary delivery location;

determine whether the one or more parcels currently stored at the computerized locker bank comprise one or more second parcels associated with the first parcel based on the one or more pieces of package level detail information for the one or more parcels currently stored at the computerized locker bank and the first package level detail information, wherein determining whether the one or more parcels currently stored at the computerized locker bank comprise one or more second parcels associated with the first parcel comprises determining whether any of the one or more parcels currently stored at the computerized locker bank have a consignee selected from a group consisting of:

(i) a neighbor of the first consignee;

(ii) an individual that shares the primary delivery address with the first consignee; and (iii) the first consignee;

in response to determining that the one or more parcels currently stored at the computerized locker bank comprise the one or more second parcels, route the first parcel to the computerized locker bank without attempting delivery of the first parcel at the primary delivery location;

receive a request to deliver the first parcel to the computerized locker bank;

in response to receiving the request, determine, based on the one or more first dimensions and the one or more second dimensions, whether a particular one of the plurality of selectively securable locker compartments is sufficiently large to accommodate both the first parcel and the one or more second parcels associated with the first parcel;

determine which of the plurality of selectively securable locker compartments is currently storing the one or more second parcels;

operate, the one or more locking mechanisms on the particular one of the plurality of selectively securable locker compartments to open the one or more doors;

operate the one or more locking mechanisms on the selectively securable locker compartment that is currently storing the one or more second parcels to open the one or more doors;

facilitate a transfer of the one or more second parcels associated with the first parcel from the selectively securable locker compartment that is currently storing the one or more second parcels to the particular one of the plurality of selectively securable locker compartments; and facilitate placement of the first parcel in the particular one of the plurality of selectively securable locker compartments along with the one or more second parcels associated with the first parcel.

* * * * *